US008179229B2

(12) United States Patent
Mullet

(10) Patent No.: US 8,179,229 B2
(45) Date of Patent: May 15, 2012

(54) SYSTEM AND METHODS FOR AUTOMATICALLY MOVING ACCESS BARRIERS INITIATED BY MOBILE TRANSMITTER DEVICES

(75) Inventor: Willis J. Mullet, Gulf Breeze, FL (US)

(73) Assignee: Homerun Holdings Corporation, Pensacola, FL (US)

( * ) Notice: Subject to any disclaimer, the term of this patent is extended or adjusted under 35 U.S.C. 154(b) by 1093 days.

(21) Appl. No.: 12/077,303

(22) Filed: Mar. 18, 2008

(65) Prior Publication Data

US 2008/0169900 A1 Jul. 17, 2008

Related U.S. Application Data

(60) Continuation-in-part of application No. 11/999,539, filed on Dec. 6, 2007, now Pat. No. 7,635,960, which is a division of application No. 11/296,849, filed on Dec. 8, 2005, now Pat. No. 7,327,108, which is a continuation-in-part of application No. 11/211,297, filed on Aug. 24, 2005, now Pat. No. 7,327,107.

(51) Int. Cl.
*H04Q 9/00* (2006.01)

(52) U.S. Cl. ........................................................ 340/5.71

(58) Field of Classification Search ................. 340/5.71, 340/5.73, 5.64; 318/280

See application file for complete search history.

(56) References Cited

U.S. PATENT DOCUMENTS 4,942,393 A 7/1990 Waraksa et al. .......... 340/825.72
5,177,900 A 1/1993 Solowiej ......................... 49/363
5,319,364 A 6/1994 Waraksa et al. .......... 340/825.72
5,406,275 A 4/1995 Hassett et al. ................ 340/933
5,412,379 A 5/1995 Waraksa et al. .......... 340/825.72
5,515,036 A 5/1996 Waralsa et al. .......... 340/825.72
5,831,533 A 11/1998 Kanno .......................... 340/573
5,903,226 A 5/1999 Suman et al. ............ 340/825.69
5,940,007 A 8/1999 Brinkmeyer et al. .... 340/825.69
5,973,611 A 10/1999 Kulha et al. .............. 340/825.31

(Continued)

FOREIGN PATENT DOCUMENTS

DE 299 01 677 2/2003

(Continued)

OTHER PUBLICATIONS

*Hands-Free Actuation of Remote Controls*: Nerac Document No. (NDN) 085-00002-0080-9; author Unknown; published Apr. 23, 2004.

*Primary Examiner* — Vernal Brown

(74) *Attorney, Agent, or Firm* — Renner Kenner Greive Bobak Taylor & Weber

(57) ABSTRACT

An operator system provides a mobile transmitter configured to communicate with a base operator to automatically open and close an access barrier based on the position of a carrying device that maintains the mobile transmitter. The mobile transmitter periodically transmits a mobile open signal as it moves away from the reception range of the base operator until that signal is lost. When the base operator again receives the open signal, the access barrier is automatically opened. In addition, the mobile transmitter is configured to monitor the change in position of the carrying device as it moves away from the enclosure. When the angular and/or linear position of the carrying device changes by an amount greater than a predetermined threshold, the mobile transmitter automatically transmits a mobile close signal to the base operator to close the access barrier.

13 Claims, 12 Drawing Sheets

U.S. PATENT DOCUMENTS

| | | | | |
|---|---|---|---|---|
| 5,990,828 | A | 11/1999 | King | 342/359 |
| 6,002,332 | A | 12/1999 | King | 340/545.1 |
| 6,011,468 | A | 1/2000 | Lee | 340/545.1 |
| 6,028,537 | A | 2/2000 | Suman et al. | 340/988 |
| 6,172,430 | B1 | 1/2001 | Schmitz et al. | 307/10.2 |
| 6,271,765 | B1 | 8/2001 | King et al. | 340/825.69 |
| 6,285,931 | B1 | 9/2001 | Hattori et al. | 701/29 |
| 6,388,559 | B1 | 5/2002 | Cohen | 340/5.71 |
| 6,400,956 | B1 | 6/2002 | Richton | 455/456 |
| 6,415,439 | B1 | 7/2002 | Randell et al. | 725/153 |
| 6,448,894 | B1 | 9/2002 | Desai | 340/505 |
| 6,476,732 | B1 | 11/2002 | Stephan | 340/988 |
| 6,513,252 | B1 | 2/2003 | Schierbeek et al. | 33/356 |
| 6,542,076 | B1 | 4/2003 | Joao | 340/539 |
| 6,559,775 | B1 | 5/2003 | King | 340/932.2 |
| 6,563,431 | B1 | 5/2003 | Miller, Jr. | 340/932.2 |
| 6,593,845 | B1 | 7/2003 | Friedman et al. | 340/10.33 |
| 6,615,132 | B1 | 9/2003 | Nagasaka et al. | 701/200 |
| 6,634,408 | B2 | 10/2003 | Mays | 160/188 |
| 6,693,581 | B2 | 2/2004 | Gottwald et al. | 342/70 |
| 6,803,851 | B1 | 10/2004 | Kramer et al. | 340/5.61 |
| 6,894,601 | B1 | 5/2005 | Grunden et al. | 340/10.41 |
| 6,911,898 | B2 | 6/2005 | Chung | 340/5.64 |
| 6,943,725 | B2 | 9/2005 | Gila | 342/42 |
| 6,970,085 | B2 | 11/2005 | Okabe et al. | 340/545.6 |
| 7,068,181 | B2 | 6/2006 | Chuey | 340/825.69 |
| 7,071,813 | B2 | 7/2006 | Fitzgibbon | 340/5.71 |
| 7,135,957 | B2 | 11/2006 | Wilson | 340/5.61 |
| 7,167,076 | B2 | 1/2007 | Wilson | 340/5.61 |
| 7,194,412 | B2 | 3/2007 | Mays | 704/275 |
| 7,289,014 | B2 | 10/2007 | Mullet et al. | 340/5.7 |
| 7,310,043 | B2 * | 12/2007 | Mamaloukas | 340/5.61 |
| 7,327,107 | B2 | 2/2008 | Mullet et al. | 318/280 |
| 2004/0012483 | A1 | 1/2004 | Mays | 340/5.71 |
| 2004/0070516 | A1 | 4/2004 | Nielsen | 340/825.72 |

FOREIGN PATENT DOCUMENTS

| | | | |
|---|---|---|---|
| DE | 20 2004 004 446 | U1 | 10/2004 |
| EP | 1 026 354 | A2 | 8/2000 |
| EP | 1 176 392 | A1 | 1/2002 |
| EP | 1 184 236 | | 3/2002 |
| EP | 1 298 955 | A1 | 4/2003 |

* cited by examiner

SYSTEM AND METHODS FOR AUTOMATICALLY MOVING ACCESS BARRIERS INITIATED BY MOBILE TRANSMITTER DEVICES

CROSS REFERENCE TO RELATED APPLICATION

This application is a continuation-in-part of prior application Ser. No. 11/999,539, filed on Dec. 6, 2007 now U.S. Pat. No. 7,635,960, which is a divisional application of prior application Ser. No. 11/296,849, filed on Dec. 8, 2005, now U.S. Pat. No. 7,327,108, which is a continuation-in-part of prior application Ser. No. 11/211,297, filed on Aug. 24, 2005, which is now U.S. Pat. No. 7,327,107 all of which are incorporated herein by reference.

TECHNICAL FIELD

Generally, the present invention relates to an access barrier control system, such as a garage door operator system for use on a closure member moveable relative to a fixed member and methods for programming and using the same. More particularly, the present invention relates to the use of a mobile transmitter maintained by a carrying device, such as a vehicle, to initiate the opening and closing of an access barrier depending upon the position of the carrying device relative to the access barrier. Specifically, the present invention relates to an access barrier control system that utilizes a mobile transmitter that is enabled to automatically open an access barrier, such as a garage door, based on the generation of an open signal, and automatically closing the access barrier when the carrying device experiences a change in position beyond a predetermined threshold and generates a close signal.

BACKGROUND ART

When constructing a home or a facility, it is well known to provide garage doors that utilize a motor to enable the opening and closing of the door. Motors may also be coupled with other types of movable barriers such as gates, windows, retractable overhangs and the like. An operator is employed to control the motor and related functions with respect to the door. The operator receives command input signals for the purpose of opening and closing the door from a portable wireless remote transmitter, from a wired or wireless wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable access barrier between limit positions a user-actuated remote radio frequency (RF) or infrared transmitter is used to actuate the motor and move the door in the desired direction. As such, these remote devices allow for users to open and close garage doors without getting out of their car. Additionally, such remote devices may be provided with other features, such as the ability to control multiple doors, lights associated with the doors, and other security features. As is well documented in the art, the remote devices and operators may be provided with encrypted codes that change after every operation cycle so as to make it virtually impossible to "steal" a code and use it at a later time for illegal purposes. An operation cycle may include opening and closing of the barrier, turning on and off a light that is connected to the operator and so on.

Although remote transmitters and like devices work well, they are cumbersome and distracting to the driver, as his or her hands are occupied with maintaining a controlled grip over the steering wheel, or gear shift while exiting the garage or driveway. As such, the potential damage resulting from the inadvertent actuation of the remote transmitter while the vehicle is in the path of the access barrier is increased. Furthermore, the switch mechanism of the remote device typically becomes worn after a period of time and requires replacement. To overcome these disadvantages, various systems for the "hands-free" operation of the remote transmitter have been developed. Such hands-free systems comprise a mobile transmitter that communicates, via various mobile signals, with a base operator that is configured to actuate an access barrier, such as a garage door, between opened and closed positions. Specifically, the mobile transmitter is generally carried by a carrying device, such as a vehicle, and is configured to transmit mobile signals to the base operator so as to move the access barrier between open and closed positions, depending on the relative position of the carrying device to the base operator, as well as other criteria.

Many hands-free systems utilize a mobile transmitter that is carried by a suitable carrying device, such as a vehicle, which communicates with the barrier operator, through signals periodically sent to the mobile transmitter, such that when no return signal is received, the barrier operator commands the access barrier to close. Unfortunately, such a manner of operation allows the closing of the access barrier to be potentially initiated with the user out of visual range of the door, which may result in safety concerns, as the user may be led to believe that the door has closed, when in fact an obstruction has caused the door to open and remain open allowing unauthorized access to others.

Therefore, there is a need in the art for an operator system that automatically initiates only the closing sequence for an access barrier depending upon the change in position of a carrying device. In addition, there is a need for an operator system that utilizes a mobile transmitter that automatically closes an access barrier based on the change in the angular position of a carrying device as it is moved. Furthermore, there is a need for an operator system that provides a mobile transmitter that includes an activity sensor, such as an accelerometer, so as to automatically close an access barrier when a carrying device has reached a predetermined linear distance from the access barrier. Still yet, there is a need for a mobile transmitter that includes an accelerometer that is capable of discriminating between unintended movement, such as the accidental movement of the mobile transmitter within a carrying device, and movement resulting from the acceleration of the carrying device, so as to conserve the transmitter's power source and properly control the movement of the access barrier. In addition, there is a need in the art for a mobile transmitter that automatically emits somewhat periodic signals that are received by the operator so as to automatically open an access barrier when the carrying device approaches the closed access barrier. And there is a need for a mobile transmitter that provides user-changeable sensitivity adjustment of the mobile open signal. Furthermore, there is a need for a mobile transmitter that includes a transceiver, to provide two-way communication between the mobile transmitter and the base operator solely to facilitate the selection and learning or re-learning of an optimum mobile remote transmitter communication frequency.

DISCLOSURE OF THE INVENTION

One aspect of the present invention, which shall become apparent as the detailed description proceeds, is attained by a system and methods for automatically moving access barriers initiated by mobile transmitter devices.

Another aspect of the present invention is to provide an operator system for automatically controlling access barriers used to enclose a carrying device, comprising a base controller associated with at least one access barrier, at least one base receiver associated with the base controller, and at least one mobile transmitter transmitting an open signal and a close signal, wherein the transmitter monitors a change in position of the carrying device and transmits the close signal when the mobile transmitter detects that the position of the carrying device has changed a predetermined amount, and wherein the mobile transmitter transmits the open signal automatically, the base controller selectively generating barrier movement commands depending upon when the open and close signals are received by the at least one base receiver.

Still another aspect of the present invention is method of automatically closing and opening an access barrier based on a change in position of a carrying device comprising automatically and periodically transmitting from a mobile transmitter maintained in the carrying device an open signal, determining whether a positional change of the carrying device exceeds a predetermined threshold value, transmitting from the transmitter a close signal if a change in a position of the carrying device exceeds the predetermined threshold value, receiving in a barrier operator that controls movement of the access barrier the open signal and the close signal, and closing the barrier when the close signal is received and the access barrier is open, and opening the access barrier after receiving the open signal and the access barrier is closed, but only after not receiving the open signal for a predetermined period of time.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
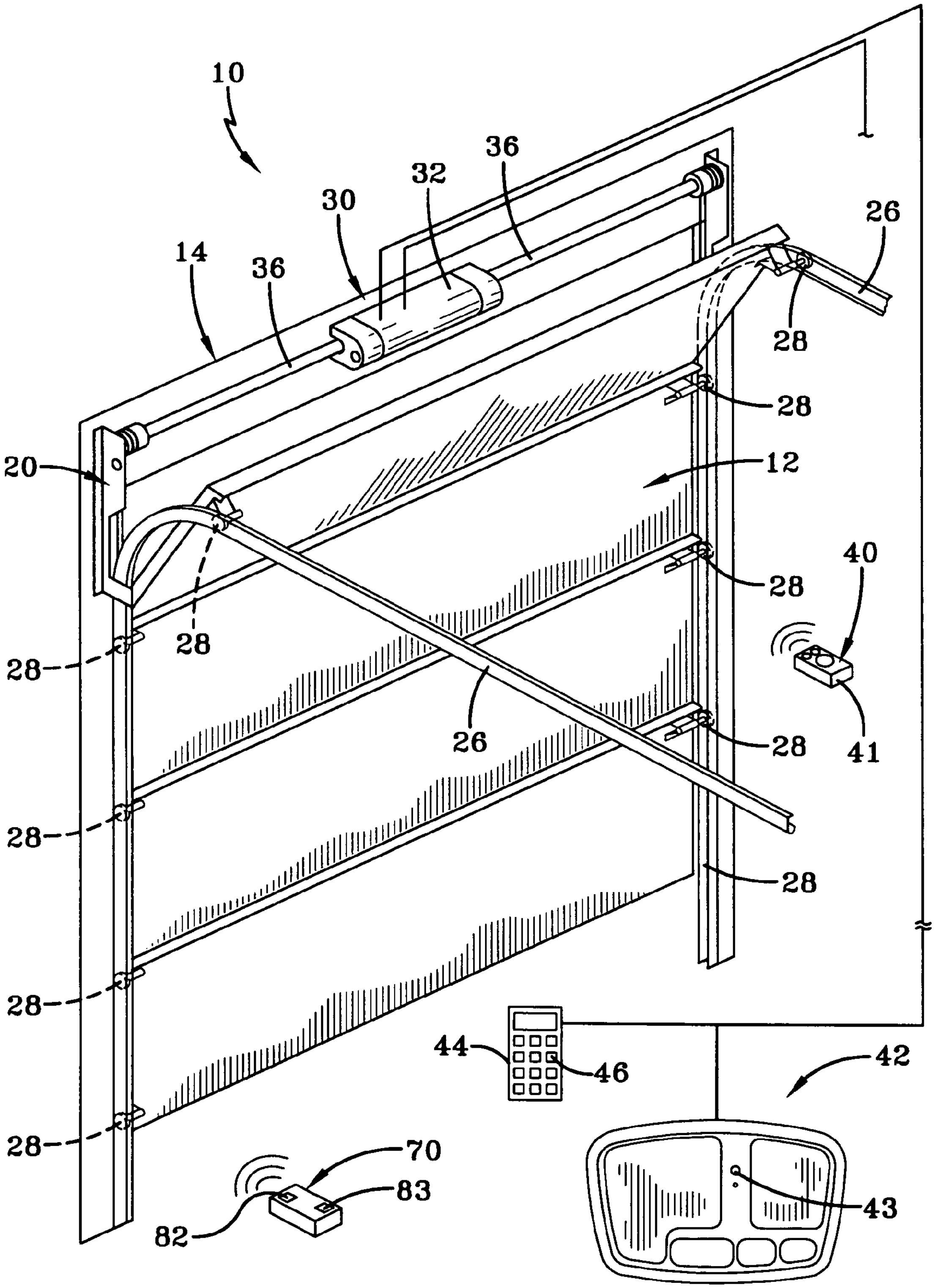
FIG. 1 is a perspective view depicting a sectional garage door and showing an operating mechanism embodying the concepts of the present invention.

A system, such as a garage door operator system, which incorporates the concepts of the present invention, is generally designated by the numeral 10 in FIG. 1. Although the present discussion is specifically related to an access barrier such as a garage door, it will be appreciated that the teachings of the present invention are applicable to other types of barriers. The teachings of the invention are equally applicable to other types of movable barriers such as single panel doors, gates, windows, retractable overhangs and any device that at least partially encloses or restricts access to an area. Moreover, the teachings of the present invention are applicable to locks or an automated control of any device based upon an operational status, position, or change in position of a proximity or triggering device. Indeed, it is envisioned that the present teachings could be used as a remote keyless entry for automobiles, houses, buildings and the like.

The discussion of the system 10 is presented in three subject matter areas: the operator; the hands-free mobile transmitter; and operation of the mobile transmitter with the operator. The discussion of the operator presents aspects commonly found in a garage door operator and which enable features provided by the mobile transmitter. The structural aspects of the mobile transmitter include a discussion of an encryption technique utilized thereby; use of an activity and/or an ignition sensor by the mobile transmitter; and the setting of sensitivity levels and the ability of the mobile transmitter to be actuated manually. Finally, the discussion of the operation of the mobile transmitter and the operator is presented in two different operational scenarios. The first scenario relates to the use of the mobile transmitter to generate a signal to automatically close the access barrier based on the change in position of a carrying device, such as a vehicle; and the second scenario relates to the use of at least one mobile transmitter signal sequence to open the access barrier based on the proximity of the mobile transmitter to the access barrier. Furthermore, the second scenario provides an alternative mobile transmitter, which is more easily learned to the garage door operator while incorporating any or all of the benefits associated with the other scenario.

I. Operator

The system 10 may be employed in conjunction with an access barrier 12, such as a conventional sectional garage door or other barrier. The opening in which the door is positioned for opening and closing movements relative thereto is surrounded by a frame generally indicated by the numeral 14. A track 26 extends from each side of the door frame and receives a roller 28 which extends from the top edge of each door section. A counterbalancing system generally indicated by the numeral 30 may be employed to balance the weight of the garage door 12 when moving between open and close positions or conditions. One example of a counterbalancing system is disclosed in U.S. Pat. No. 5,419,010, which is incorporated herein by reference.

Figure 2:
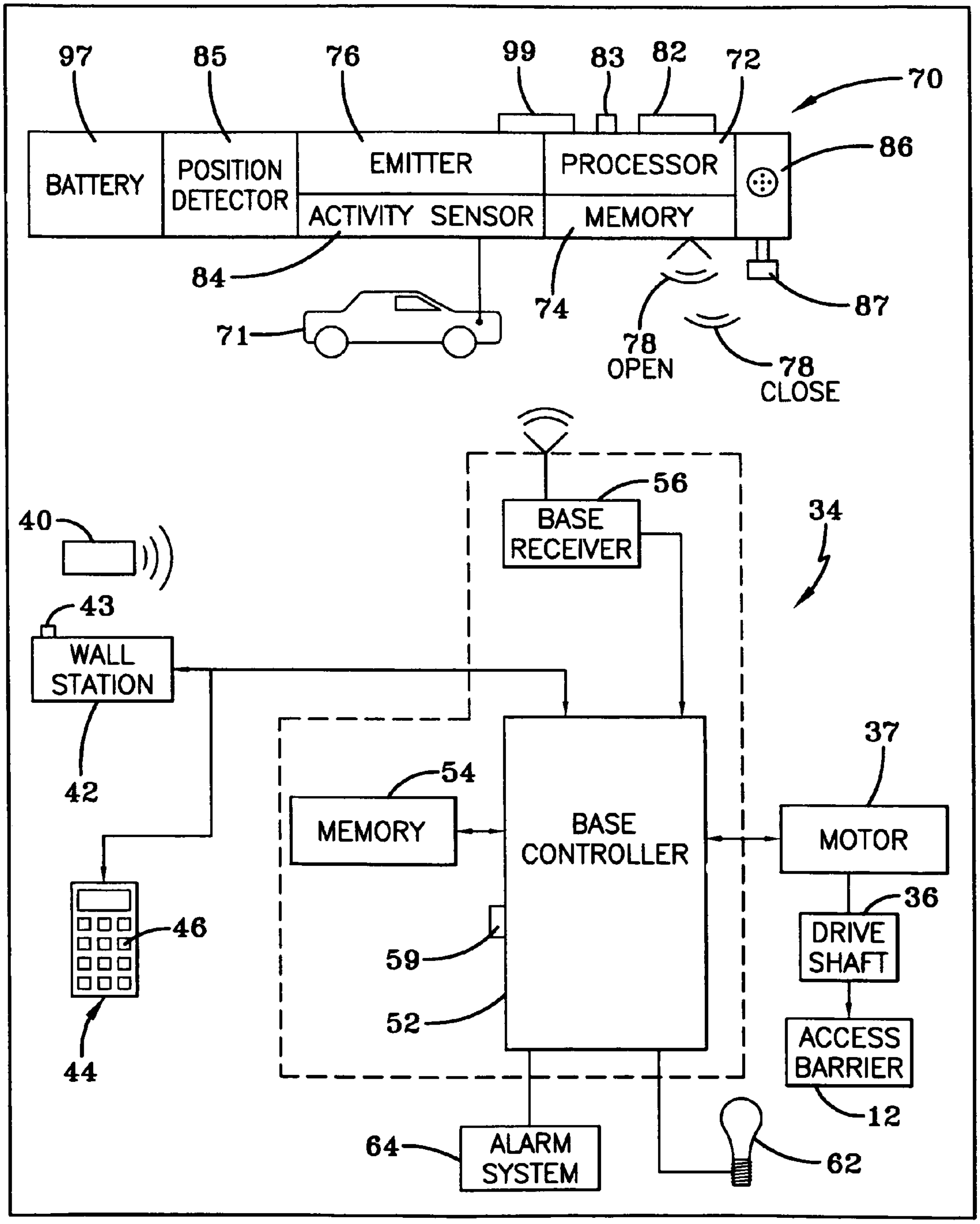
FIG. 2 is a block diagram of an operator system with a hands free mobile remote transmitter and a base operator according to the present invention.

An operator housing 32, which is affixed to the frame 14, carries a base operator 34 shown in detail in FIG. 2. Extending through the operator housing 32 is a drive shaft 36, which is coupled to the door 12 by cables or other commonly known linkage mechanisms. Although a header-mounted operator is disclosed, the control features to be discussed are equally applicable to other types of operators used with movable barriers. For example, the control routines can be easily incorporated into trolley type, screwdrive and jackshaft operators used to move garage doors or other types of access barriers. In any event, the drive shaft 36 transmits the necessary mechanical power to transfer the access barrier 12, such as a garage door, between opened and closed positions. In the housing 32, the drive shaft 36 is coupled to a drive gear wherein the drive gear is coupled to a motor 37 in a manner well known in the art.

Briefly, the base operator 34 powered by a suitable power source, such as a mains power outlet commonly found in residential homes, may be controlled by a wireless remote transmitter 40, which has a housing 41, or a wall station control 42 that is wired directly to the system 10 or which may communicate via radio frequency or infrared signals. The remote transmitter 40 requires actuation of a button to initiate or stop the movement of the access barrier 12 between positions. The wall station control 42 is likely to have additional operational features not present in the remote transmitter 40. The wall station control 42 is carried by a housing, which has a plurality of buttons thereon. Each of the buttons, upon actuation, initiates a particular command to the base operator 34 to initiate activity, which may include opening/closing of the access barrier 12, turning various lights on and off and the like. A program button 43, which may be recessed and preferably actuated only with a special tool, allows for programming of the base operator 34 for association with remote transmitter 40, and more importantly with a hands-free mobile transmitter to be discussed below. The system 10 may also be controlled by a remote keyless alphanumeric device 44, which includes a plurality of keys 46 with alphanumeric indicia thereon. It is also contemplated that the alphanumeric device 44 may include a display for the visual presentation of information regarding the system 10. In one aspect, actuating the keys 46 in a predetermined sequence allows for actuation of the access barrier 12, as well as to initiate various other features maintained by the base operator 34. As such, the transmitters 40, 42, and 44 provide the user with the ability to command the base operator 34 to move the access barrier 12 between opened and closed positions.

The base operator 34 also includes a base controller 52, which incorporates the necessary software, hardware and memory storage devices for controlling the operation of the overall system and for implementing the various advantages of the present invention. And while the base controller 52 may comprise Model MSP430F1232 supplied by Texas Instruments, it should be appreciated that other equivalent receivers, transceivers and controllers could be utilized.

In electrical communication with the base controller 52 is a storage device 54, which may comprise volatile memory, such as flash memory, or non-volatile memory, as well as a combination of both. The storage device 54 enables the base operator 34 to permanently store information utilized by the base controller 52 in conjunction with the operation of the base operator 34. The memory device 54 may maintain identification codes, state variables, count values, timers, door status, a last process or barrier move direction, and the like to enable operation of the mobile transmitter. Infrared and/or radio frequency signals generated by the transmitters 40, 42, 44 and the mobile transmitter to be discussed are received by a base receiver 56 which transfers the received information to a decoder contained within the base controller 52. Those skilled in the art will appreciate that the base receiver 56 may be replaced with a transceiver, which would allow the base controller 52 to facilitate learning of other devices, or to relay or generate command/status signals to other devices associated with the operator system 10. As such, the base controller 52 converts the received radio frequency signals or other types of wireless signals received from the transmitter 40 and various other wireless transmitters, including the mobile transmitter to be discussed, into a compatible format. It will be appreciated that the base receiver 56 utilizes an antenna suitable for receiving the desired radio frequency or infrared beacon signals from the various wireless transmitters.

Continuing, while the base receiver 56 is directly associated with the base operator 34, it may be configured as a stand-alone device. During operation, the base receiver 56 receives signals in a frequency range centered about 372 MHz generated by the transmitter, although the base receiver 56 may also be configured to receive signals in a frequency range of 900 to 950 MHZ, as well as any other frequency range. Indeed, one frequency range may be designated for only receiving door move signals from a transmitter, while the other frequency range receives identification type signals used to determine position or travel direction of a mobile transmitter relative to the base receiver 56, as well as door move signals. Of course, other frequency ranges compatible with the system 10 and approved for use by the appropriate government agency may be used.

In addition, the base controller 52 is capable of directly receiving transmission type signals from a direct wire source as evidenced by the direct connection to the wall station 42. And while the keyless device 44 may be directly connected to the base controller 52, it may also be configured to operate wirelessly and communicate with the base operator 34 via suitable RF signals. Furthermore, any number of remote transmitters 40*a-x* can transmit a signal that is received by the base receiver 56 and further processed by the controller 52 as needed. Likewise, there can be any number of wall stations 42. A learn button 59 may also be associated with the base controller 52, wherein actuation of the learn button 59 allows the base controller 52 to learn any of the different types of transmitters used by the system 10. Thus, during operation of the system 10, if an input signal is received from either of the remote transmitter 40, the wall station 42, or the keyless device 44 and found to be acceptable, the base controller 52 generates the appropriate electrical input signals for energizing a motor 60, which in turn rotates the drive shaft 36 and opens and/or closes the access barrier 12.

The system 10 may also include a light 62 that is connected to the base controller 52 and may be programmed to turn "on" and "off" depending upon the conditions of the mobile transmitter and how it is associated with the controller 52. Likewise, an alarm system 64 may be activated and/or deactivated depending upon the position of the mobile transmitter with respect to the base receiver 56. As such, the light 62 and/or alarm 64 may also be configured to provide an indication to the user of various states or conditions of the base operator 12. For example, the light 62 and/or alarm 64 may indicate when the mobile transmitter to be discussed has been successfully learned with the barrier operator 12.

II. Mobile Transmitter

A mobile transmitter 70, which may also be referred to as a hands-free transmitter or a proximity device, is included in the system 10 and effectively operates in much the same manner as the other wireless transmitters, except direct manual input from the user is not required, although manual input could be provided. As will be discussed in detail, the mobile transmitter 70 is typically placed within or is otherwise maintained by a carrying device 71, such as a vehicle. For example, the mobile transmitter 70 may be placed in the glove compartment, or attached to the sun visor of the carrying device 71 or incorporated into the carrying device. Additionally, the mobile transmitter 70 serves as the actuation device, and initiates opening movements of the access barrier 12 depending upon its proximity and direction of travel with respect to the base operator 34. Furthermore, the mobile transmitter 70 is configured to initiate closing movements of the access barrier 12 based on a change in angular and/or linear position of the carrying device 71 maintaining the mobile transmitter 70. In other words, the mobile transmitter 70 can be placed in the glove compartment, in the console of the vehicle or incorporated into the carrying device 71. It communicates with the base controller 52 for the purpose of opening and closing the access barrier 12 depending upon the position of the mobile transmitter 70 with respect to the base receiver 56.

In particular, the mobile transmitter 70 includes a processor 72 coupled to a memory device 74, which may comprise volatile memory, non-volatile memory, or a combination of both. As will be discussed in further detail, the memory device 74 may maintain system mobile state variables, count values, timer values, signal counts and the like which are utilized to enable operation of the overall system 10. In addition, the mobile transmitter 70 includes an emitter 76 that is capable of generating mobile signals 78, such as a mobile open signal and a mobile close signal based on a periodic or a staggered basis. It should be appreciated that the mobile open and close signals 78 may comprise RF (radio frequency signals) that are in a format compatible with that of the base operator 34. “Mobile” signals, as used herein, refer to signals generated by the transmitter 70 that are a result of the transmitter’s position with respect to the operator and not as a result of a user actuating a button on the transmitter. For example, the mobile transmitter 70 may transmit the mobile signals 78 using a frequency of between about 300 MHz to 400 MHz, or that is within a frequency range of about 900 to 950 MHz, although any suitable frequency may be used. However, it should be appreciated that the mobile transmitter 70 may use any frequency that is compatible with any operator, including the base operator 34. The generation of the mobile open signal 78 and mobile close signal 78, as well as the information or format of the emitted signals may be changed depending upon a detected operational status of the carrying device, such as a vehicle, that maintains the mobile transmitter 70. Continuing, the processor 72 includes the necessary hardware, software and memory for generating signals to carry out the various functions of the present invention. The processor 72 and the memory 74 facilitate generation of the appropriate information to include in the mobile open and close signals 78 inasmuch as one remote mobile transmitter 70 may be associated with several operators or in the event several remote transmitters 70 are associated with a single operator. In other words, the base controller 52 is able to distinguish the mobile signals of different transmitters and act upon them accordingly. And the base controller is able to distinguish between an open mobile signal and a close mobile signal generated by the mobile transmitter, and since the operator in some embodiments will precisely know the position (open/close/between) and barrier movement status (moving up/moving down/stopped), the operator can respond in a desired, predetermined manner. The system will most likely be configured so that any door move commands generated by the mobile transmitter 70 can be overridden by any commands received from the wall station transmitter 42.

Continuing, the mobile transmitter 70 includes a learn/door move button 82 and a sensitivity/cancel button 83, which allows for override commands and/or programming of the mobile transmitter 70 with respect to the base controller 52. If needed, manual actuation of the learn/door move button 82, after programming, may be used to override normal operation of the proximity device 70 so as to allow for opening and closing of the access barrier 12 and also to perform other use and/or programming functions associated with the base operator 34. It is also contemplated that the actuation of the learn/door move button 82 allows the processor 72 to be programmed with updated position values in a manner to be discussed in detail below. Such updated position values may include, but are not limited to an angle threshold and/or linear distance threshold values for storage at the mobile memory unit 74. For example, the angle threshold value may be programmed to comprise a value of 35 to 45 degrees for example, although any suitable angle may be used, whereas the linear distance threshold value may be programmed to comprise a value between about 15 to 500 feet, although any suitable distance may be used. Re-programming of the threshold values may be done wirelessly, or the processor 72 and/or the memory unit 74 may be provided with a port that allows for direct re-programming. Alternatively, actuation of the sensitivity/cancel button 83, after programming, provides for temporary disablement of the hands-free features.

The mobile transmitter 70 also includes an activity sensor 84 that is coupled to the processor 72 and is configured to detect the angular or linear acceleration, movement, or displacement of the carrying device 71. Specifically, the activity sensor 84 may comprise an accelerometer, such as a multi-axis accelerometer, that is configured to detect changes in acceleration in three axes of movement. In addition, the activity sensor 84 may comprise a digital or analog compass that is configured to detect some type of observable phenomenon such as vibration of the carrying device 71 when it is energized, or the detection of electric emissions generated by the spark plugs maintained by the vehicle 71. In the alternative, the mobile transmitter 70 may be connected to an accessory or ignition switch, of the vehicle. The accessory or ignition switch determines the operational status of the carrying device 71, which causes the mobile transmitter 70 to generate mobile signals 78 in the manner to be discussed. As such, the detection of activity by the activity sensor 84 or the detection of the activity of the accessory/ignition switch by the mobile transmitter 70, allows the mobile transmitter 70 to automatically be placed into a sleep state when the carrying device 71 is not active, and be automatically placed into an awake state when the carrying device 71 is active.

Also coupled to the processor 72 is a position detector 85 that is configured to monitor, or otherwise detect a change in angular position of the carrying device 20. In one aspect, the position detector 85 may comprise a digital compass, an analog compass, a tilt switch, a gyroscope, a GPS (global positioning system) receiver, an accelerometer, as well as any other device suitable for detecting linear distance or angular changes in the position of the carrying device 71, or any combination of the foregoing devices that can generate a corresponding angle position signal for analysis by the processor 72 of the mobile transmitter 70. The position detector 85 is primarily used to detect a change in angular orientation, but in some embodiments the detector may also detect a change in linear position.

It is also contemplated that the mobile transmitter 70 may include an audio source 86 and a light source 87, such as a light-emitting diode. It is envisioned that the audio source 86 and/or the light source 87 may be employed to provide audio or verbal instructions/confirmation or light indications as to certain events that need the immediate attention of the person utilizing the mobile transmitter 70, and may also provide confirmation or rejection of the attempted programming or learning functions invoked by the buttons 82 and 83. In one aspect, the mobile transmitter 70 may be configured to turn the light 87 on and off, as well as to control various other functions, when a predetermined change in angle or distance has been attained by the carrying device 71.

In order to power the components of the mobile transmitter 70, a battery 97 coupled to the processor 72 is used. If desired, the battery 97 may be of a rechargeable type that is connectable to a power outlet provided by the carrying device. In this case, use of a long-life or rechargeable battery may eliminate the need for the activity sensor 84 or direct connection to the accessory or ignition switch of the carrying device 71.

A slide switch 99, which is ideally recessed in the transmitter housing, can be used to quickly enable or disable the mobile transmitter 70. The switch 99 is connected to the processor 72, and upon movement of the switch 99 to a disable position, a cancel command is automatically generated prior to powering down.

While the previous discussion of the mobile transmitter 70 relates to a system that enables the automatic operation of the access barrier 12, it is also contemplated that the mobile transmitter 70 may be programmed or otherwise configured to provide for the hands-free control of other systems maintained by the barrier operator 12. For example, the mobile transmitter 70 may be configured to turn the light 62 on and off, as well as to control various other functions, when a predetermined change in angle or distance has been attained by the carrying device 71.

Figure 3:
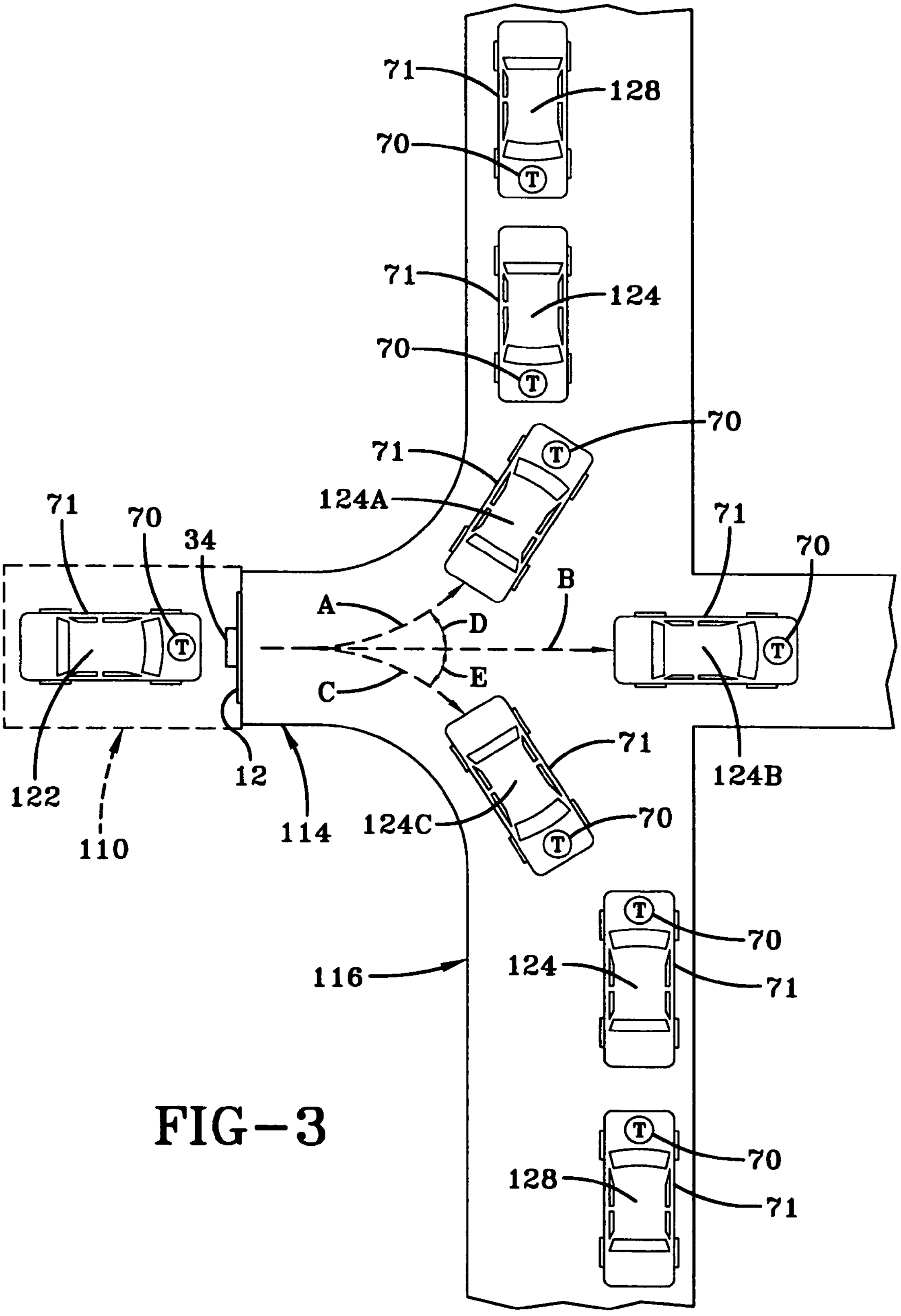
FIG. 3 is a schematic diagram of various positions of an exemplary carrying device with respect to an access barrier that utilizes the operator system according to the present invention.

Referring now to FIG. 3, the relationship between the carrying device 71 that carries the mobile transmitter 70 to various positions in and about a garage or other enclosure 110 is shown. The enclosure 110 is separated from its outer environs by the access barrier 12, which is controlled by the base operator 34 in the manner previously described. The carrying device 71 accesses the enclosure 110 via a driveway 114, which is contiguous with a street 116 or other access-type road.

The carrying device 71 is positionable in the enclosure 110 or anywhere along the length of the driveway 114 and the street 116. The carrying device 71 may be in either a "docked" state inside the enclosure 110 or in an "away" state anywhere outside the enclosure, as well as various other positions therebetween. In some instances, the "away" state may further be defined as a condition when the signals generated by the mobile transmitter 70 are no longer receivable by the base operator 34.

Thus, the system 10 is configured such that when the carrying device 71 moves from the docked state inside the enclosure 110 and experiences a change in angular and/or linear position that exceeds a predetermined threshold value that the mobile transmitter 70 transmits a mobile close signal 78 to command the base operator 34 to close the access barrier 12. Alternatively, the system 10 is configured, such that when the carrying device 71 comes within a predetermined distance, a mobile open signal periodically transmitted by the mobile transmitter 70, commands the base operator 34 to open the access barrier 12 thereby allowing access to the enclosure 110.

As such, FIG. 3 presents a graphical depiction of the two operational scenarios, in which the access barrier 12 is automatically opened based in part on the position of the carrying device 71 and automatically closed based in part on a change in an angular and/or linear movement of the carrying device with respect to the base operator 34. The first scenario occurs when the carrying device 71 moves from an away position 128 to an action position 124. And the second scenario occurs when the carrying device 71 moves from a docked position 122 or perhaps a position proximal to the docked position to an action position 124 or 124A-C. In particular, the docked position 122 represents when the vehicle or other carrying device 71 is positioned within the enclosure 110, while the action positions 124, 124A-C establish various positions outside the enclosure 110 that are clear of the path of movement of the access barrier 12, but within fairly close proximity to the enclosure. The away state 128 is identified as a position outside the range of reception of the base operator 34 for receiving a mobile signal 78 from the mobile transmitter 70. While the action positions or state 124 identify a point that is just within the reception range of the base operator 34 for receiving a mobile signal 78 from the mobile transmitter 70.

The change in the angular position of the carrying device 71 as it transitions from the docked position 122 to either of the action positions 124A-C initiates the transmission of a mobile close signal 78. That is, as the carrying device 71 leaves the docked position 122, it may proceed generally along one of 3 paths, identified as A, B, and C in which respectively correspond with the various action positions 124A-C shown in FIG. 3. However, it should be appreciated that the paths A, B, and C and action positions 124A-C are not to be construed as limiting as the carrying device 71 may follow any exit path that allows the carrying device 71 to move from the docked position 122 to any of the action positions 124. Thus, when the carrying device 71 leaves the docked position 122 within the enclosure 110, it may proceed along path A to make a left turn as indicated by the action position 124A, or it may proceed along path C to make a right turn as indicated by the action position 124C. In either event, the change of the angular orientation of the carrying device 71 between an initial baseline angle identified when the carrying device 71 is initially parked at the docked position 122 and the current angle, identified as D and E, that is experienced as the carrying device 71 is being turned left or right is identified. As such, if during the turn, the change in the angular orientation of the carrying device 71 exceeds the predetermined threshold angle value stored or otherwise maintained by the mobile transmitter 70, indicating it is outside the path of movement of the access barrier 12, as indicated at the action positions 124A and 124C, the mobile transmitter 70 transmits the mobile close signal 78 to the base operator 34 commanding it to close the access barrier 12.

In addition, the activity sensor 84 as well as the angle position detector 85 may be configured to measure the linear movement of the carrying device 71, and as such may also be used to determine if the carrying device 71 has moved by an amount that exceeds the predetermined threshold distance value that is also stored at the mobile controller 70. Thus, if the carrying device 71 does not make a turn in either direction A, or C, and proceeds along path B, which does not result in any changes in the angular orientation that exceed that of the predetermined threshold angle value stored at the mobile transmitter 70, the change in linear position between the docked state 122 and the action position 124B may be monitored to determine if it exceeds a predetermined threshold distance value. In other words, because movement of the carrying device 20 along path B to the action position 124B does not result in an angular change or a change that is below the angle threshold, the activity sensor 84 or the angle position detector 85 is used to determine whether the carrying device 71 has moved from the docked position 122 by an amount that exceeds the distance threshold value ensuring that the carrying device 71 is clear of the movement of the access barrier 12 so as to automatically close the access barrier 12. As such, when the carrying device 71 moves from the docked position 122 to the active position the angle position detector 85 or the activity sensor 84 monitor both the angular change and the linear change (distance) of the particular path A, B, and C that is taken by the carrying device 71 and compares the current angle and linear distance values to threshold values stored in the memory 74 of the mobile transmitter 70, so as to generate a mobile close signal 78 which is received and acted upon by the operator in a manner that will be discussed.

A. Encryption

It will be appreciated that the mobile open and mobile close signals 78 generated by the mobile transmitter 70 may be encrypted in accordance with various protocols discussed below. An exemplary algorithm should be fairly simple and small so as not to use all the resources of the processor 72 of the mobile transmitter 70. Different size bit keys could be used depending upon the desired level of security. The serial number of the transmitting unit, including the mobile transmitter 70, will be encrypted using an open source algorithm. Each mobile transmitter 70 is provided with a unique serial number by the manufacturer or the installer. And each base controller 52 is formatted to accept and learn a predesignated range of serial numbers, and has software to decrypt a data transmission which includes the encrypted serial number. Added security may be provided by adding a counter or other changing data that changes on every transmission by a predetermined pattern. The changing counter may be a 16-bit number that changes on every transmission according to a predetermined pattern (simple incrementing or it could be a more complex pattern). The base operator 34 will know how the counter changes and it will receive this message and it will require receipt of a second message with a new counter value that changed according to the predetermined pattern. This prevents any hostile device that emulates the transmitted message, such as the mobile open and close signals 78, and reproduces the exact same message. The base operator 34 will know that the message is not from a safe source if the counter does not change accordingly.

The base receiver 56 receives the first transmission but will then expect a second transmission with an expected change in the counter data. It will accept the command only if the counter data changes to the expected value. If the data the base receiver 56 receives does not have a changing counter, then the base receiver 56 could discard the command and assume it is from a hostile source. The key for the encryption routine is split into two parts, whereby part of the key will be a static number known to both the mobile transmitter 70 and the base operator 34, and part of the key will be derived from the counter value. This will help prevent any hostile device that receives the message, such as the mobile open and close signals 78, from having access to sensitive data such as the serial number. The mobile transmitter 70 will transmit the encrypted sensitive data and the counter in the open in the following manner:

| Transmitted Data | | | |
|---|---|---|---|
| Header | Counter | Encrypted Serial Number | Other non-encrypted Data |

The base receiver 56 will use the same static key to decrypt the sensitive data, and it will check the counter to make sure it is at the expected value. If both the key decrypts the data properly and the counter validates correctly, only then will the base receiver 56 accept the command or mobile open or close signal transmitted by the mobile transmitter 70. As such, use of such an encryption algorithm facilitates use of the mobile transmitter 70 with the operator system.

B. Activity/Ignition Sensors

As previously discussed, the mobile transmitter 70 utilizes the activity sensor 84 to determine when the carrying device 71 is active. In particular, the activity sensor 84 may comprise an accelerometer, as well as other sensors that are able to detect vibration or electrical noise or other detectable phenomenon generated by the carrying device 71 to indicate that it is in an operative or moving condition, or has been otherwise started. In addition, the activity sensor 84 may comprise a compass or an accelerometer, such that activity or the operational status of the carrying device 71 can be determined through detection of small changes in the angular position of the carrying device 71.

Figure 4:
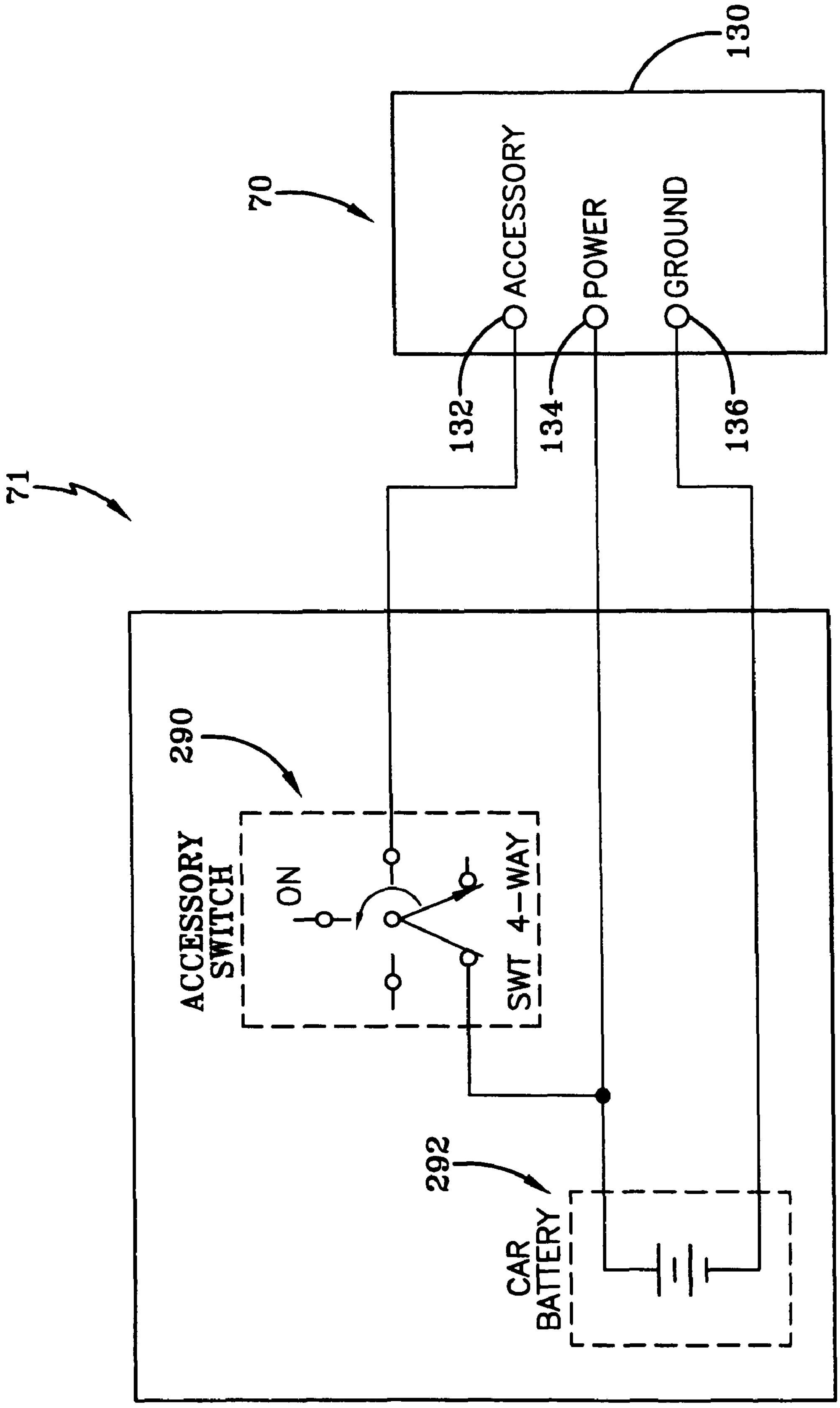
FIG. 4 is a schematic diagram of an exemplary mobile remote transmitter connected to the carrying device's power source according to the present invention.

Alternatively, the operational state of the carrying device 71 may be detected by an ignition sensing circuit 130 maintained by the mobile transmitter 70, as shown in FIG. 4, which is directly connected to the electrical operating system of the carrying device 71 and also provides an indication as to its operating status. Furthermore, the mobile transmitter 70 may also be powered directly by the carrying device 71 via the connection to the ignition circuit 130, which is coupled to an accessory or ignition switch 290 maintained by the carrying device 71. The ignition switch 290, which is connected to a battery 292, comprises a four-way switch with at least an ignition position and an accessory position. The ignition sensing circuit 130 of the mobile transmitter 70 includes an accessory terminal 132, a power terminal 134, and a ground terminal 136. The ground terminal of the battery 292 is connected to the ground terminal 136 of the mobile transmitter 70, while the power terminal 134 of the mobile transmitter 70 is connected to the positive terminal of the battery 292. The accessory terminal 132 is connected to the accessory position, such that when a key received by the switch 290 it is turned to the accessory position, then the ignition sensing circuit 130 of the mobile transmitter 70 detects such an occurrence and performs in a manner that will be discussed.

Having the mobile transmitter 70 connected directly to the power supply or battery 292 of the vehicle 71 provides advantages over a solely battery-powered proximity device, as the battery 97 maintained by the mobile transmitter 70 would no longer be needed. Furthermore, the three-wire configuration of the accessory or ignition switch 290 may be employed wherein a single wire provides constant power from the battery 292 to the carrying device 70. Another wire connects the accessory switch 290 to the vehicle 71 and as such powers the mobile transmitter 70, and a third wire provides the common ground connection to the vehicle 70. While the prior discussion sets forth the various connections utilized to couple the mobile transmitter 70 to the accessory switch 290 of the vehicle, it should be appreciated that all three of the signals discussed are normally found in a vehicle, such as a combustion driven vehicle, as well as an electric or hybrid-electric vehicle. Furthermore, the three-wire set-up could possibly be minimized to a two-wire set-up if the common/ground is attached to a metal chassis of the vehicle 71. In any event, the mobile transmitter 70 draws power from the constant power supply of the vehicle 71 and uses the ignition sensing circuit 130 as a means of detecting of when the vehicle 71 is operational.

Moreover, by employing such a configuration, the mobile transmitter 70 is connected to the battery 292 of the vehicle 71 at all times, and thus there is no need to worry about a "sleep time" for the mobile transmitter 70 since it is now powered directly by the battery 292 of the vehicle 71. As such, if the accessory switch 290 is on, the mobile transmitter 70 remains in an active state. However, if the accessory or ignition switch 290 is off, the mobile transmitter 70 enters a sleep mode to minimize current draw from the battery 292. And it will further be appreciated that the mobile transmitter 70 always has the ability to relay any change of state (active/sleep) information to the base receiver 56 of the base operator 52.

C. Sensitivity Settings/Mobile Manual Input

Generally, the mobile transmitter 70 determines whether the carrying device 71 is active and initiates communications with the base operator 34 via the base receiver 56. That is, the mobile transmitter 70 is capable of generating various mobile open and close signals 78 with different transmit power levels and, if needed, with different identification codes for receipt by the base controller 52 at an appropriate time. In response to the various mobile open and close signals 78 received by the base operator 34, the base controller 52 executes the automatic opening or closing of the access barrier 12, as well as various status change commands. It will be appreciated that FIGS. 5A-B sets forth the operation of the mobile transmitter 70 as it relates to button commands for programming or setting the desired sensitivity. The sensitivity level sets power levels to an approximate wireless signal range as to when a door is to be opened using a mobile open signal 78. And the sensitivity level may dictate values for variable counters used for system sensitivity. For example, sensitivity settings may be very different for opening a garage door that is associated with a short driveway as opposed to one that has a very long driveway. Sensitivity settings may also be adjusted according to whether the garage door is located in an electrically noisy environment. A discussion is also provided as to how manual door move or cancellation commands are processed.

Figure 5A:
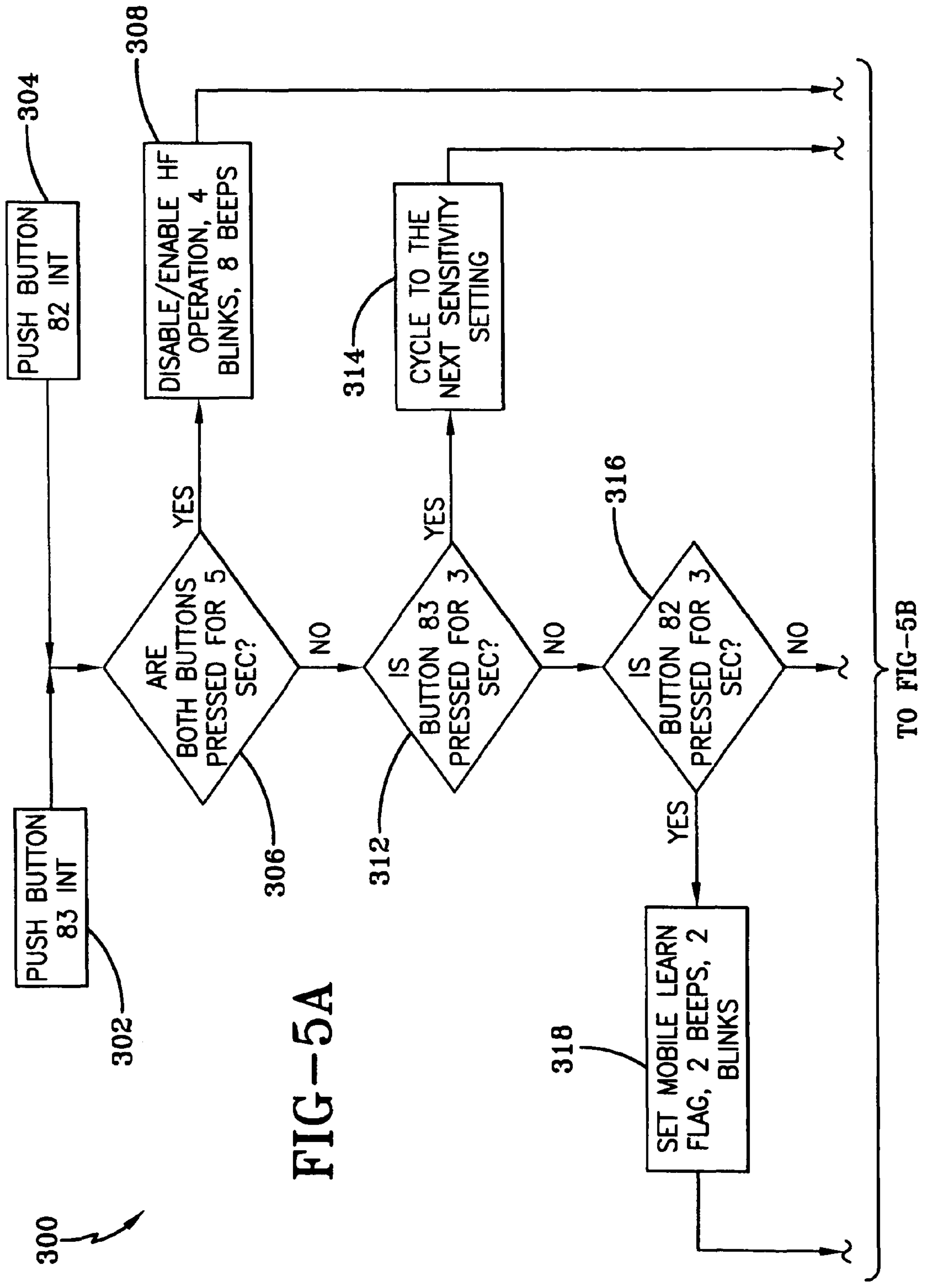
FIGS. 5A and 5B are an operational flowchart showing the initial programming and use of the mobile remote transmitter utilized in the operator system according to the present invention.
Figure 5B:
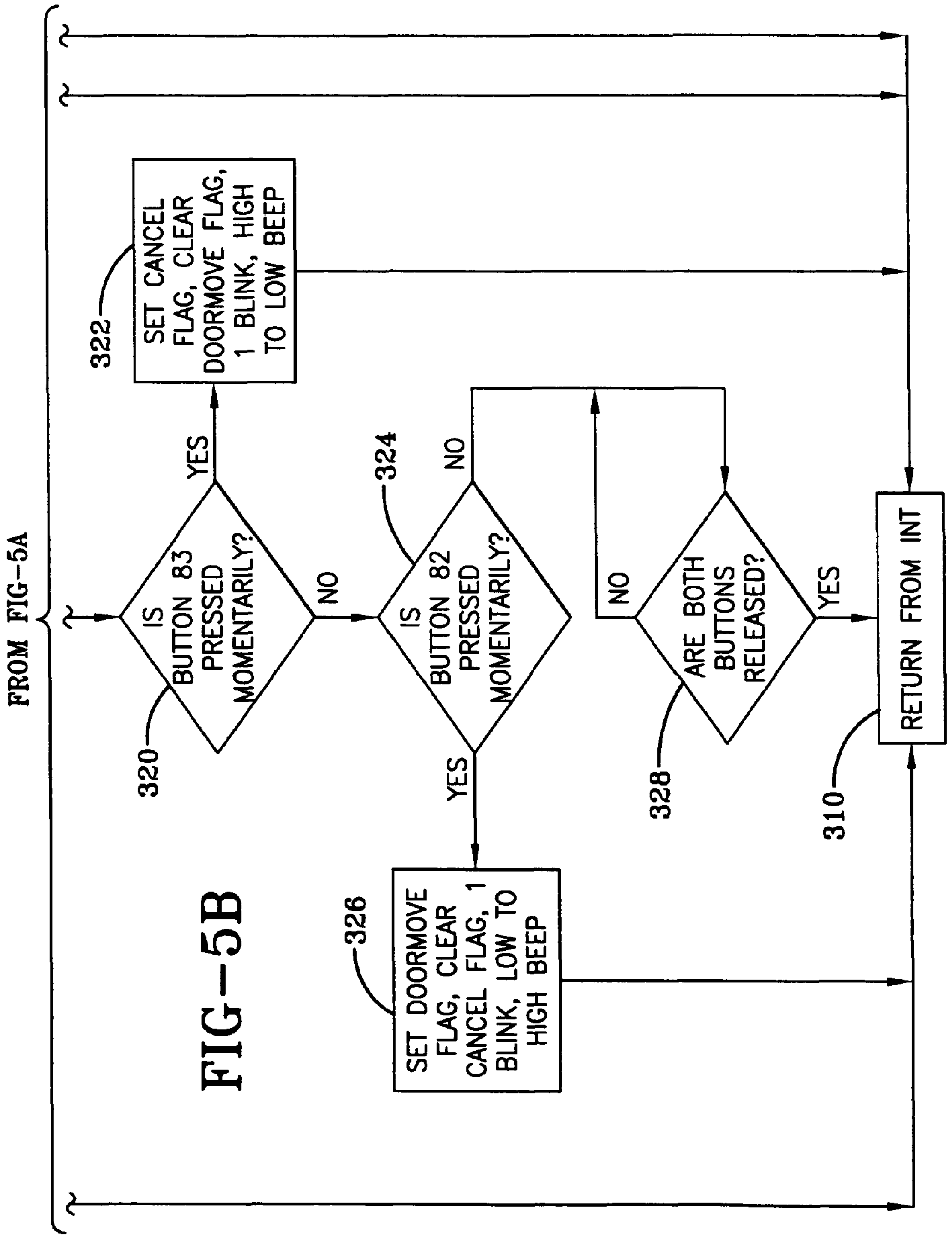

It can be seen that a methodology for adjusting the sensitivity of the mobile transmitter 70 by actuation of the buttons provided by the mobile transmitter 70 is designated generally by the numeral 300, as shown in FIGS. 5A-B. As discussed previously, the mobile transmitter 70 includes a learn/door move button 82 and a sensitivity/cancel button 83. Accordingly, if the sensitivity/cancel button 83 is actuated at step 302, or if the learn/door move button 82 is actuated at step 304, then the processor 72 makes an inquiry as to whether both buttons 82,83 have been pressed for five seconds or some other predetermined period of time. If so, the operation of the mobile transmitter 70 is either disabled or enabled, and this is confirmed by four blinks and eight beeps generated by the audio and light sources 86 and 87 respectively. However, it should be appreciated that other confirmation signals or sequence of beeps and blinks could be used. In any event, upon completion of step 308 the process returns to step 310 and the remote mobile transmitter 70 awaits a next button actuation.

If at step 306 the buttons 82 and 83 are not pressed for the predetermined period of time then the processor 72 of the mobile transmitter 70 inquires at step 312 as to whether the sensitivity/cancel button 83 has been pressed for a predetermined period of time, such as three seconds. If the button 83 is held for more than three seconds, the process continues to step 314, where the processor 72 allows for cycling to a desired sensitivity setting. It will be appreciated that the mobile transmitter 70 may be provided with one or more transmit power levels. In this embodiment, there are four power levels available thus allowing a different value to be set for the mobile open signal 78. For example, the four power levels may be designated, from lowest to highest, as P0, P1, P2 and P3. If at step 312 it is determined that button 83 has not been pressed for more than three seconds, the process continues to step 316 to determine whether the learn/door move button 82 has been pressed for a predetermined period of time, such as three seconds, or not. If the learn/door move button 82 has been pressed for more than three seconds, then at step 318 the mobile learn flag is set and this is confirmed by the beeping of the audio source 86 twice and the blinking of the light source 87 twice. Upon completion of the confirmation, the process proceeds to step 310 and normal operation continues. If, however, at step 316 it is determined that the learn/door move button 82 has not been pressed for three seconds, then the process continues to step 320 where the processor 72 of the mobile transmitter 70 determines whether the sensitivity/cancel button 83 has been momentarily pressed or not. If the learn/door move button 82 has been pressed, then at step 322 a cancel flag is set, a door move flag is cleared, and a confirmation signal in the form of one blink by the light source 96 and a high to low beep generated by the audio source 94. And then the process is completed at step 310.

If at step 320 the sensitivity/cancel button 83 is not pressed momentarily, then the process inquires as to whether the learn/door move button 82 has been momentarily pressed or not at step 324. If the button 82 has been momentarily pressed, then at step 326 the door move flag is set, the cancel flag is cleared and a confirmation is provided in the form of one blink and a low to high beep or audio tone. This step allows for execution of a manual door move command if desired. If button 82 is not momentarily pressed at step 324, then the processor, at step 328, awaits for both buttons to be released. Once this occurs then the process is completed at step 310.

III. Mobile/Operator Operation

For the purposes of clarity the reader is reminded that the discussion that follows is to explain setting of the threshold values that will cause the mobile transmitter to initiate sending of a mobile close signal. The discussion continues with the operational scenarios of when a mobile open signal and a mobile close signal are generated by the mobile transmitter so as to initiate the auto-closure of the access barrier 12 and the auto-opening of the access barrier 12, wherein both scenarios are implemented by interaction between the mobile transmitter 70 and the operator 34.

Before setting forth the operational steps for automatically closing the access barrier 12 based on a change in position of the carrying device 71, a presentation of the sequence utilized to establish the predetermined threshold angle and position values utilized by the mobile transmitter 70 when automatically closing the access barrier 12 will be presented.

Figure 6:
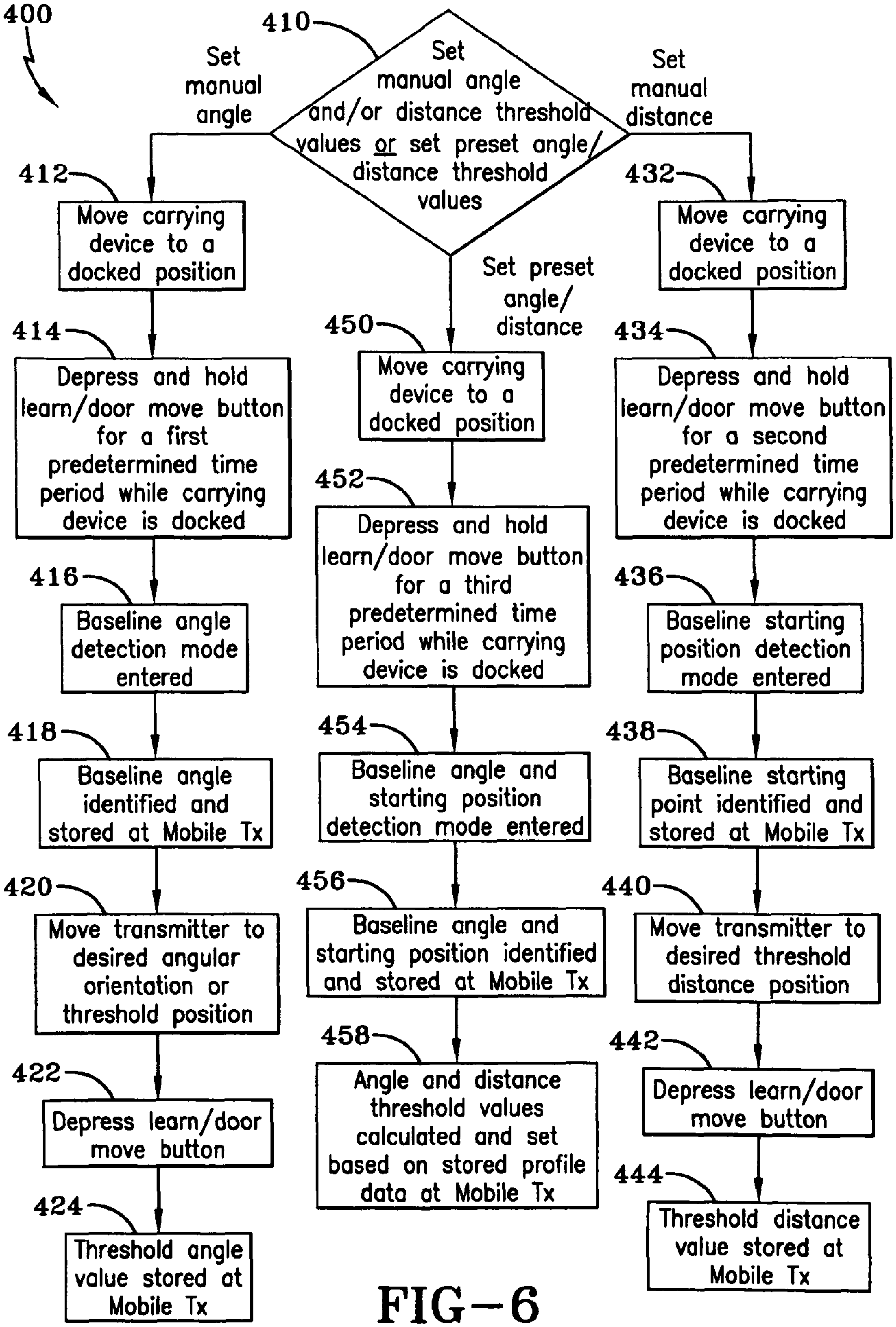
FIG. 6 is an operational flowchart showing the operational steps to teach the mobile transmitter to identify and store a threshold angle value and/or a threshold distance value according to the present invention.

The operational steps taken to establish the threshold positional (angle and distance) values used by the mobile transmitter 70 in accordance with the automatic closing of the access barrier 12 are indicated generally by the numeral 400, as shown in FIG. 6. Initially at step 410, the user of the mobile transmitter 70 determines whether to manually set the threshold angle value, the threshold distance value, or to use a preset profile to automatically calculate the threshold angle and threshold distance values.

If the user elects to manually set the threshold angle value, the user initially moves the carrying device 71 to a docked, or otherwise stationary position that is within an enclosure whose access is controlled by the access barrier 12, as indicated at step 412. That is, the docked position is where the user of the carrying device 20 would normally park the carrying device 71 when not in use. Next, at step 414 the user depresses and holds the learn/door move button 82 of the mobile transmitter 70 for a first predetermined amount of time while the carrying device 71 is in the docked position to invoke the baseline angle detection mode indicated at step 416. However, it should be appreciated that the baseline angle detection mode may be entered using a variety of techniques, including depressing the learn/door move button 82 in a predetermined sequence, or any other unique manner of indicating that the mode of step 416 is to be initiated. Next, the baseline angle of the carrying device 71 generated by the position detector 85 is identified and then stored in the memory 74, as indicated at step 418. After step 418 is performed, the carrying device 71 and transmitter 70 are moved to a position outside of the enclosure and clear of the path of the access barrier 12, as indicated at step 420. The position outside of the enclosure to which the carrying device 71 is moved should be indicative of the typical driving pattern taken by the user when exiting the enclosure, and preferably is a position that still allows the driver to view the access barrier 12 as he or she is leaving. Once the carrying device 71 is moved to the desired position, the process continues to step 422, where the learn/door move button 82 is depressed, and the current angle value associated with the position of the carrying device 71 established in step 420 is generated by the position detector 85, identified and stored in the memory 74. At step 424, the mobile transmitter 70 calculates and stores the threshold angle value based on the change in magnitude of the angle between the baseline and current angle values identified at steps 418 and 422.

Alternatively, if the user desires to manually set the threshold distance value, the user initially moves the transmitter 71 and the carrying device 70 to a docked or otherwise stationary position that is within an enclosure whose access is controlled by the access barrier 12, as indicated at step 432. That is, the docked position is where the user would normally park the carrying device 71 when not in use. Next, at step 434 the user depresses and holds the learn/door move button 82 of the mobile transmitter 70 for a second predetermined amount of time, which is different from the amount of time used in step 414, while the carrying device 71 is in the docked position to invoke the baseline distance detection mode indicated at step 436. However, it should be appreciated that the baseline distance detection mode may be entered using a variety of techniques, including depressing the learn/door move button 82 in a predetermined sequence, or any other unique manner of indicating that the mode of step 436 is to be initiated. Next, the baseline position or starting point at which the carrying device 71 is docked is identified and stored in the memory 74, as indicated at step 438. After step 438 is performed, the carrying device 71 is moved to a position outside of the enclosure and clear of the path of the access barrier 12, as indicated at step 440. The position outside of the enclosure to which the carrying device 71 is moved should be indicative of the typical driving pattern taken by the use when exiting the enclosure, and preferably is a position that still allows the driver to view the access barrier 12 as he or she is leaving. Once the carrying device 71 is moved to the desired position, the process continues to step 442, where the learn/door move button 82 is depressed, and the current position of the carrying device 71 established in step 440 is identified by the activity sensor 84 or the position detector 85 and stored in the memory 74. At step 444, the mobile transmitter 70 calculates and stores the threshold distance value based on the distance that is between the baseline starting position and the current position values identified at steps 438 and 442.

The user may also decide to use preset values that have been pre-programmed into the mobile transmitter 70 to set the threshold angle and distance values. To set such values, the user initially moves the carrying device 71 to a docked or otherwise stationary position that is within an enclosure whose access is controlled by the access barrier 12, as indicated at step 450. That is, the docked position is where the user would normally park the carrying device 71 when not in use. Next, at step 452 the user depresses and holds the learn/door move button 82 of the mobile transmitter 70 for a third predetermined amount of time, which is different from the amount of time used in steps 414 and 434, while the carrying device 71 is in the docked position to invoke the baseline angle and distance detection mode indicated at step 454. However, it should be appreciated that the baseline angle and distance detection mode may be entered using a variety of techniques, including depressing the learn/door move button 82 in a predetermined sequence, or any other unique manner of indicating that the mode of step 454 is to be initiated. Next, the baseline angle and baseline position/starting point corresponding to the docked position of the carrying device 71 is identified by the position detector 85 and/or the activity sensor 84 and stored in the memory 74, as indicated at step 456. Next, at step 458 the angle and distance threshold values are calculated by the processor 72 using the baseline values previously identified in step 456. That, is the mobile transmitter 70 utilizes the pre-programmed criteria, such as a predetermined angular or positional change from the identified baseline values to calculate the threshold angle and threshold distance values, which are then stored in the mobile transmitter 70. For example, the pre-programmed criteria may include angle values of 30-45 degrees and/or distance values of 15 to 500 feet, although any suitable angle or distance value may be used.

While the operational steps 400 set forth above are indicative of one manner of implementing the identification of the threshold angle and distance values, such should not be construed as limiting, as such process or sequence may be readily modified or altered using known techniques, while still retaining the general functionality of the process 400.

Figure 7:
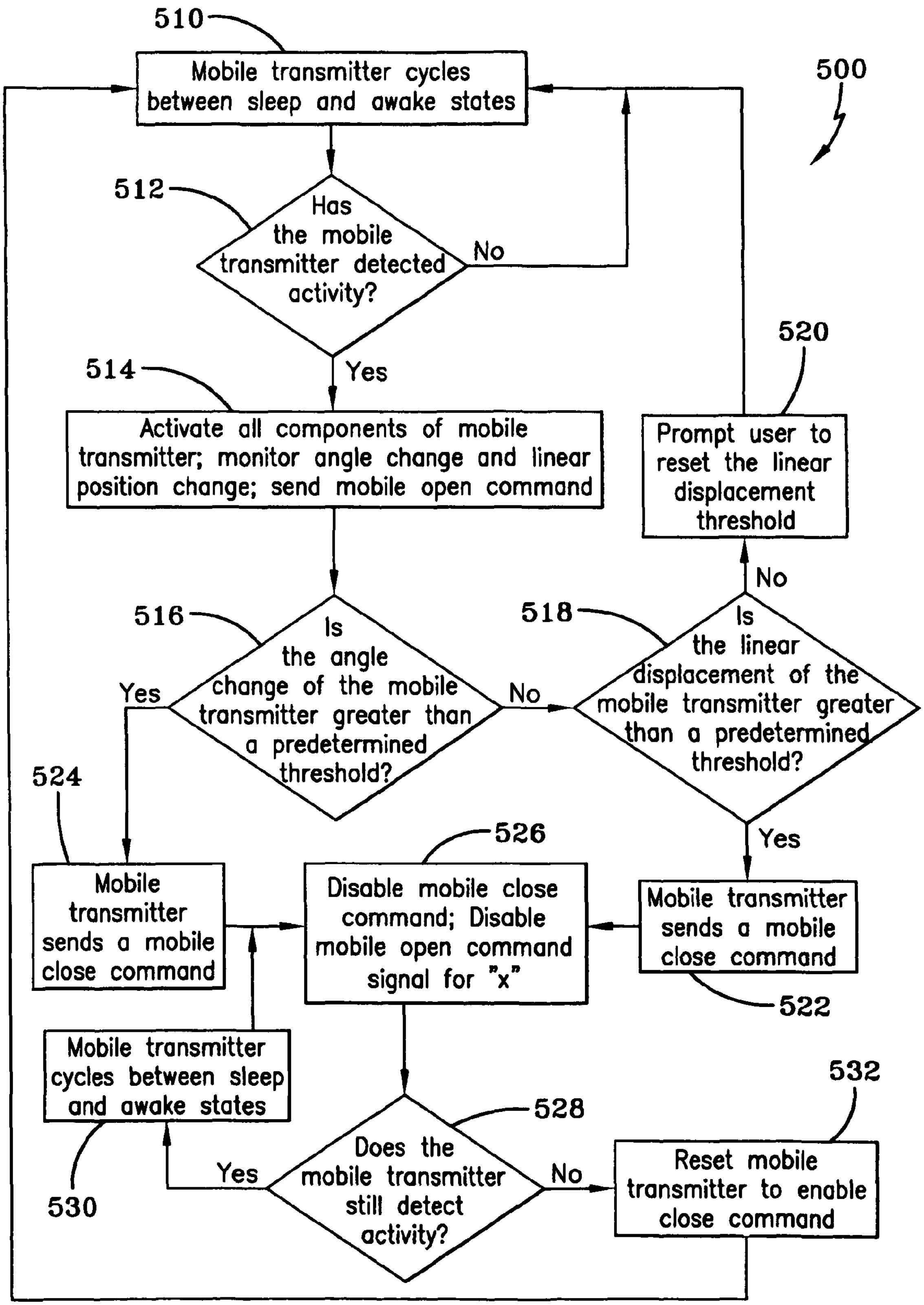
FIG. 7 is an operation flowchart showing the operational steps taken by the mobile transmitter as the carrying device changes position to generate a close command according to the present invention.

With the procedure for establishing the threshold angle and distance values utilized by the mobile transmitter in carrying out the auto-close features of the present invention set forth, the discussion of the specific steps for carrying out the auto-close feature of the present invention is presented below. In particular, the steps for automatically closing the access barrier 12 based on a change in position of the carrying device 71 are generally referred to by the numeral 500, as shown in FIG. 7. Initially, at step 510, the mobile transmitter 70 cycles continuously between sleep and awake states. For example, the sleep and awake states may comprise respective time periods of 2 seconds and 1 millisecond, although any other suitable time periods may be used. That is, during a sleep state, the mobile transmitter 70 may be powered off, or placed in a low-power mode. It is also contemplated that the sleep state and/or awake state may be configured such that only some of the components of the mobile transmitter 14 may be turned off or on. For example, the mobile transmitter 70 may be configured so that only the activity sensor 84 is active during the awake state, while the remaining components of the mobile transmitter 70 are off. During an awake state of the mobile transmitter 70, the process determines whether the mobile transmitter 70 has detected any activity or movement of the carrying device 71 via the activity sensor 84, as indicated at step 512. If the mobile transmitter 70 has not detected any activity of the carrying device 71, the process returns to step 510, where the mobile transmitter 70 resumes cycling between sleep and awake states as previously discussed. However, if the mobile transmitter 70 has detected that the carrying device 71 is active, the process continues to step 514. At step 514, all of the components of the mobile transmitter 70 are fully activated, and the angle position detector 85 begins to monitor the angular change in position of the carrying device 71, as well as any changes in linear displacement or position of the carrying device 71. And the mobile transmitter 71 generates a mobile open signal 78. Next, the process continues to step 516, where the mobile transmitter 70 determines whether the change in angular position of the carrying device 71 is greater than a predetermined threshold value. For example, the threshold angle value may be at least 35 to 45 degrees, although any other suitable angle may be used. Indeed, an angular change of 15 degrees could be sufficient. If the change in angular position of the carrying device 71 does not exceed the predetermined threshold angle value, then the process continues to step 518. At step 518, the process determines whether the linear displacement of the carrying device 71, as determined by the mobile transmitter 70, is greater than a predetermined threshold distance value. For example, the threshold distance value may be at least 15 to 500 feet, although any other linear distance value may be utilized. If the amount of linear displacement of the carrying device 71 is not greater than the predetermined threshold value, the process continues to step 520, where the user is prompted, via the audio source 86 or the light source 87 to reset the linear displacement threshold value via the process 400, before returning to step 510. It will be appreciated that step 518 may be considered a secondary test in the event a specified change in angle is not detected at step 516. Skilled artisans will also appreciate that linear displacement could be the primary test and angular change the secondary test for whether to generate a mobile close signal. And in some embodiments a second test may not be implemented.

Returning to step 518, if the linear displacement of the carrying device 71, as determined by the mobile transmitter 70, does exceed the predetermined threshold value, then the process continues to step 522, where the mobile transmitter 70 transmits a mobile close signal 78 to the base operator 34 to automatically close the access barrier 12.

Returning to step 516, if the change in angular position of the carrying device 71, as determined by the mobile transmitter 70 is greater than the predetermined angular threshold value, then the process continues to step 524. At step 524, the mobile transmitter 70 transmits a mobile close signal 78 to the base operator 34 to automatically close the access barrier 12.

Thus, at steps 522 and 524 of the process, the mobile transmitter 70 transmits a mobile close signal 70 to the base operator 34 to automatically close the access barrier 12. Once the mobile close command signal 78 is transmitted to the base operator 34, the process continues to step 526, where the ability of the mobile transmitter 70 to transmit a mobile close command signal is disabled. Also at this time, generation of the mobile open command signal is disabled for a predetermined period of time such as five minutes for example. This is done to prevent the barrier from inadvertently opening if the user with the mobile transmitter happens to drive by their garage shortly after leaving. By preventing generation of unneeded mobile close commands, power drain at the transmitter's battery is reduced. And such a feature reduces the possibility of interference with other devices. After the ability of the mobile transmitter 70 to transmit a mobile close signal 78 is disabled, the process continues to step 528. At step 528 the process determines whether the mobile transmitter 70 is still detecting any activity of the carrying device 71. If the mobile transmitter 70 is detecting activity of the carrying device 71, the process continues to step 530, whereby the mobile transmitter 70 resumes cycling between sleep and awake states. However, if at step 528, the mobile transmitter 70 does not detect any activity at the carrying device 71, then the process continues to step 530. At step 530 the mobile transmitter 70 is reset so as to allow it to be capable of transmitting a subsequent mobile close signal 78, whereupon the process returns to step 510.

Figure 8:
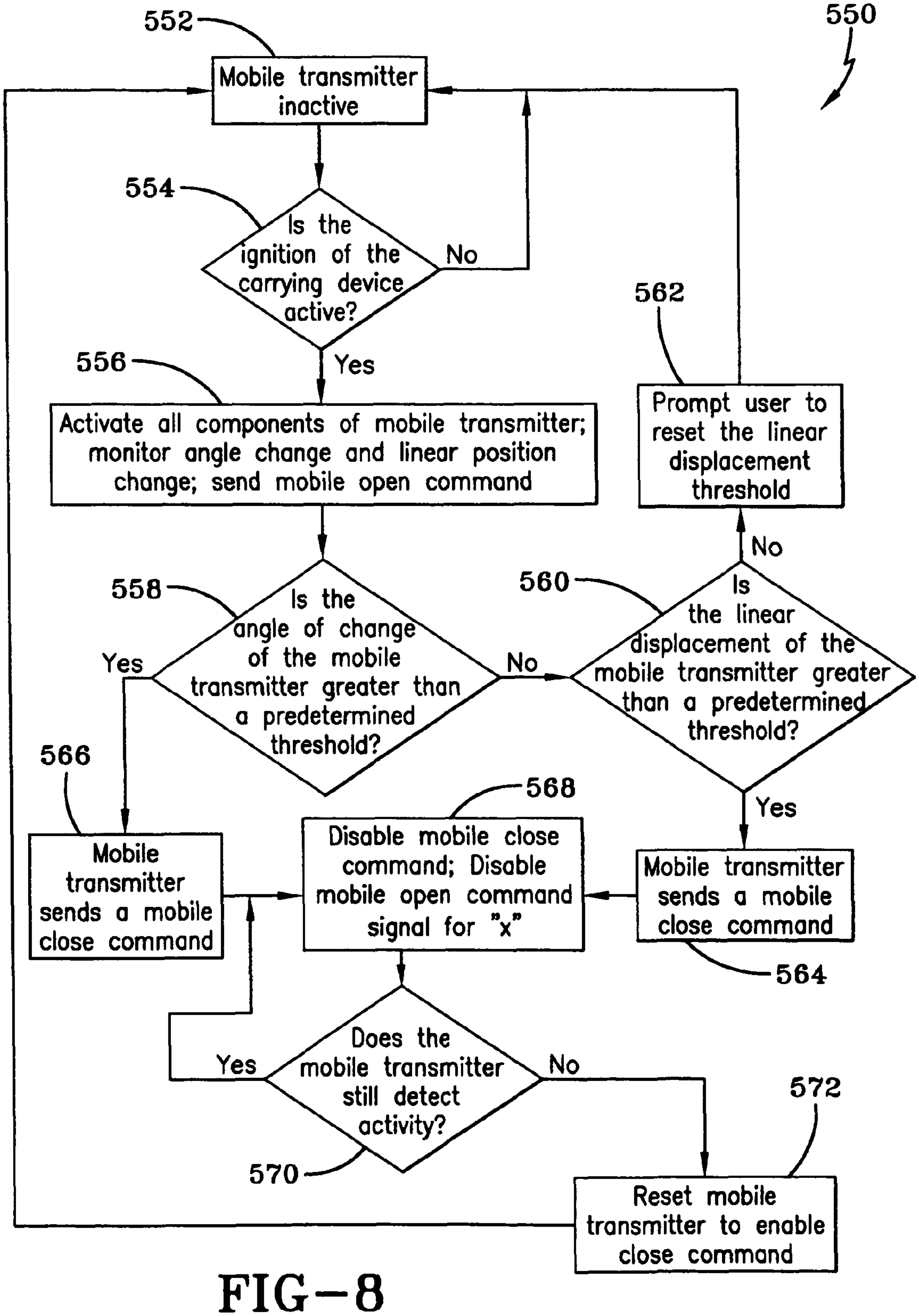
FIG. 8 is an operational flowchart showing the operational steps for an alternative embodiment of the system to generate a close command according to the present invention.

In another embodiment of implementation of the auto-close feature of the present invention, it is contemplated that the angle position detector 85 comprises a two-axis analog compass, although a two-axis digital compass may also utilized. Furthermore, in this embodiment the activity sensor 84 comprises the ignition sensing circuit 130 or detector that is used to determine when the carrying device 71 is active. As such, the operational steps taken by the system 10 when utilizing the two-axis compass and ignition sensor are generally referred to by the numeral 550 in FIG. 8. Initially, at step 552, the carrying device 71, such as a vehicle, is in a "docked" state, or otherwise parked within the enclosure 110, such that the mobile transmitter 70 is in an inactive state as the ignition of the carrying device 71 is in an "off" state. That is, the mobile transmitter 70 is configured so that it is powered off when the ignition of the carrying device 71 is deactivated. Continuing to step 554, the process determines if the ignition of the carrying device 71 has been activated. If the ignition of the carrying device 71 has not been activated, then the process returns to step 552, where the mobile transmitter 70 remains in an inactive state. However, if the ignition of the carrying device 71 has been activated, as detected by the activity sensor 84, then the process continues to step 556. At step 556, all of the components of the mobile transmitter 70 are made active, or are otherwise turned "on," and the two-axis compass comprising the angle position detector 85 begins to monitor for any change in angular position as well as any change in linear position of the carrying device 71. And the mobile transmitter 71 generates a mobile open command signal. Somewhat simultaneously with step 556, the step 558 is performed, whereby the process determines whether the carrying device 71 has sustained an angular change that is greater than a predetermined threshold value. If the carrying device 71 has not sustained a change in angular position that is greater than the predetermined threshold angle value, then the process continues to step 560. At step 560, the process determines whether the change in linear displacement of the carrying device 71 is greater than a predetermined threshold distance value. If the amount of linear displacement of the carrying device 71 is not greater than the predetermined threshold distance value, the process continues to step 562, where the user is prompted, via the audio source 86 or the light source 87 to reset the predetermined threshold distance value via the process 400, before returning to step 552.

Returning to step 560, if the linear displacement of the carrying device 71, as determined by the mobile transmitter 70, does exceed the predetermined threshold distance value, the process continues to step 564, where the mobile transmitter 70 transmits a mobile close signal 78 to the base operator 34 to automatically close the access barrier 12.

Returning to step 558, if the change in angular position of the carrying device 71, as determined by the mobile transmitter 70 is greater than the predetermined threshold angle value, then the process continues to step 566. At step 566, the mobile transmitter 70 transmits a mobile close signal 78 to the base operator 34 to automatically close the access barrier 12.

Thus, at steps 564 and 566 of the process the mobile transmitter 70 transmits a mobile close command signal 78 to the base operator 34 to automatically close the access barrier 12. Once the mobile close signal 78 is transmitted to the base operator 34, the process continues from either of steps 564 and 566 to step 568, where the ability of the mobile transmitter 70 to transmit a mobile close command is disabled. As noted previously, such a feature reduces the possibility of interference with the operation of other devices. After the ability of the mobile transmitter 70 to transmit a mobile close signal 78 is disabled, the process continues to step 570. At step 570, the process determines whether the mobile transmitter 70 still detects that that the ignition of the carrying device 71 is active. Thus, if the mobile transmitter 70 detects that the ignition of the carrying device 71 is still active, the process returns to step 568. However, if the mobile transmitter 70 does not detect that the ignition of the carrying device 71 is still active, the process continues to step 572. At step 572, the ability of the mobile transmitter 70 to transmit a mobile close signal 78 is reset, or otherwise re-enabled, whereupon the process returns to step 552. And as is discussed in regard to the operational embodiment shown in FIG. 5, this embodiment may use only one test to detect a positional change (angular or linear) or the criteria used in the primary and secondary tests may be switched.

Figure 9:
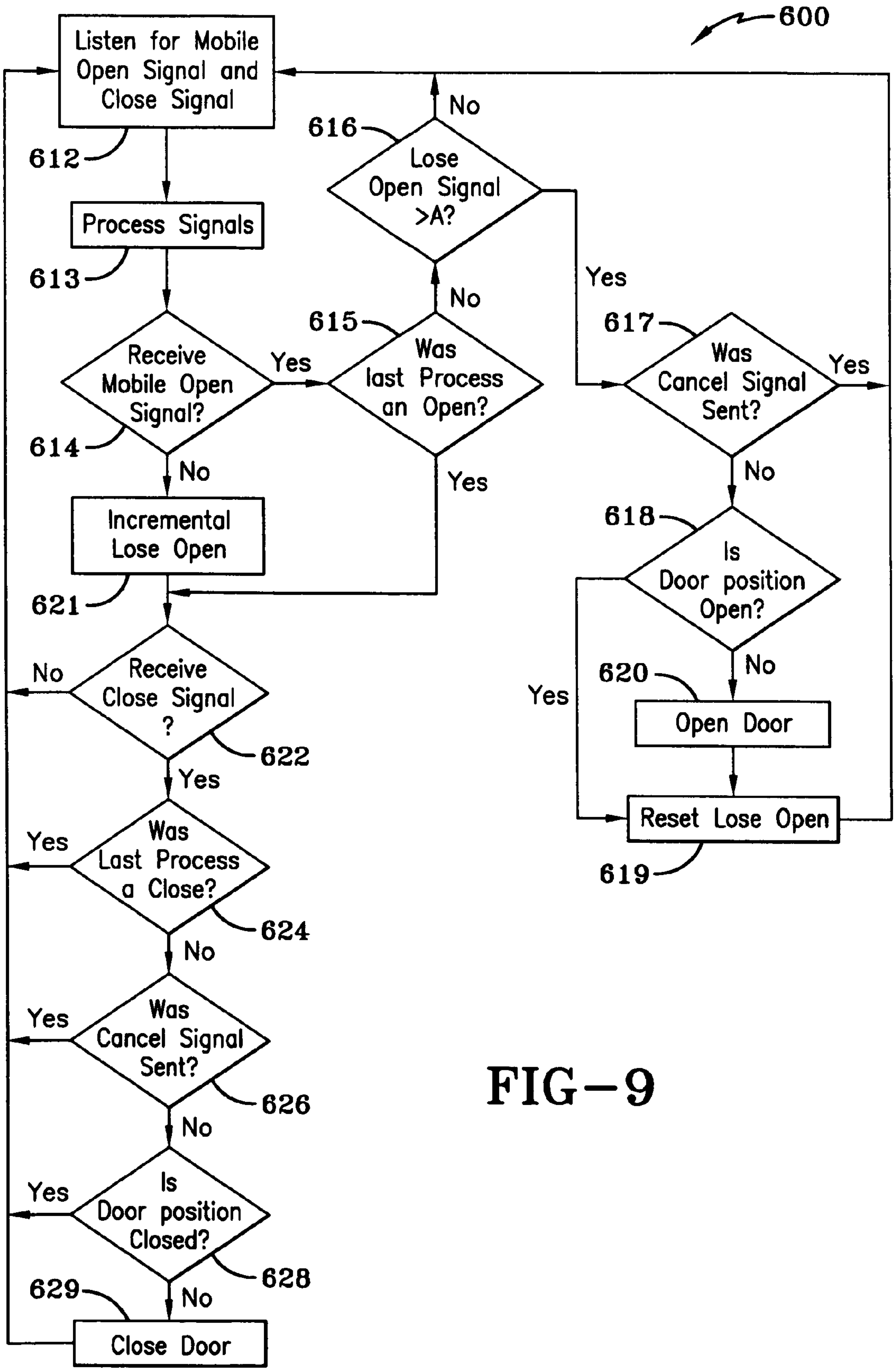
FIG. 9 is an operational flowchart illustrating the operation of the mobile transmitter when utilized to implement an auto-open sequence of the access barrier initiated by the mobile transmitter according to the present invention.

A methodology for operation of the base controller 52 to automatically close and open the access barrier 12 based on the transmitted mobile open command signal or the mobile close command signal received by the base operator 34, is designated generally by the numeral 600, as shown in FIG. 9. Initially, it will be appreciated that the remote mobile transmitter 70 is learned to the base controller 52 in a conventional fashion by actuation of learn button 59 on the base controller 52 and actuation of one of the buttons 82, 83 on the mobile transmitter 70. Of course, other learning methods could be used. In this basic methodology, the base controller 52 maintains a variable identified as "last process," which is initially set equal to "open" whereby this variable may be changed to "close" when appropriate. Other variables may be maintained to supplement and enhance operation of the system. For example, the "lose open" variable count is maintained to ensure that the mobile transmitter 70 is in fact out of the range of reception of the base operator 34 before any specific action is taken.

The base controller 52 monitors frequencies detected by the base receiver 56, and in particular listens for a mobile open signal 78 and/or a mobile close signal 78, either of which may also be referred to as a mobile close command signal or a mobile open command signal, and which are generated by the mobile transmitter 70 or any one of the other transmitters 40,44 and wall station 42 at step 612. Next, at step 613 the operator 34 begins processing of the signals. At step 614 the base controller 52 determines whether a mobile open signal 78 has been received or not. If a mobile open signal 78 has been received, then the base controller 52 investigates the "last process" variable at step 615 to determine whether the last course of action was an "open" door move or a "close" door move. If the last process variable was not "open," then at step 616, the base controller 52 queries as to whether a process variable "lose open" is greater than A. The value A is usually set by the manufacturer, but provisions could be made for re-programming of the variable as required be certain operating environments. In any event, this query is made to ensure that an inappropriate action is not taken until the mobile transmitter 70 is in fact away or out of range of the base controller 52. If the lose open variable is not greater than A, then the process returns to step 612. However, if at step 616 the lose open variable is greater than A, the base controller 52 queries as to whether a cancel signal has been sent by the mobile transmitter 70 or not at step 617. If a cancel signal has been sent, then the process returns to step 612 and any door move command that would otherwise be generated by the controller 52 is not sent. If a cancel signal has not been received at step 617, then the process continues to step 618, where the base controller 52 determines whether the access barrier 12 is open or not. As noted previously, the base controller 52 is able to detect the position of the access barrier 12 by use of mechanisms associated with the door movement apparatus. In any event, if the door position is open, the process continues to step 619 and the variable lose open is reset and then the process returns to step 612. However, if the door position is not open, as determined at step 618, then at step 620 the controller 52 executes an open door command and the variable last process is set equal to open. And then at step 619, the variable lose open is reset to a value, typically zero. Upon completion of step 619, the process returns to step 612.

Returning to step 614, if a mobile open signal 78 is not received, then at step 621 the lose open variable is incremented and the process continues at step 622. Or, if at step 615 the last process variable is designated as open, then the process continues on to step 622 where the controller 52 determines whether a close signal has been received or not. If at step 622 a close signal has not been received, then the process returns to step 612. Alternatively, if a mobile close signal from the mobile transmitter 71 or a signal from one of the remote transmitters 40,44 or wall station 42 is received by the base operator 34 at step 622, the process continues to step 624, where the base controller 52 queries as to whether the last process variable was a close movement. If the last process variable was set to close, then the process returns to step 612. However, if the last process variable was not set to close at step 624, the process continues to step 626. At step 626, the process determines whether a cancel signal has been sent by the transmitters 40,44 or the wall station 42 or from the mobile transmitter 71.

If a cancel signal has received by the base operator 34 at step 626, then the process returns to step 612. However, if a cancel signal has not been received by the base operator 34, then the base controller 52 inquires as to whether the position of the access barrier 12 is closed or not, as indicated at step 628. If the position of the access barrier 12 is closed, then the process returns to step 612. However, if the position of the access barrier 12 is not closed, then at step 629 the base controller 52 generates a door close command and the access barrier 12 is closed and the variable last process is set equal to close, whereupon the process returns to step 612.

As can be seen from the methodology 600, the use of the mobile open signal 78 generated by an active mobile transmitter 70 enables the hands-free operation so as to open the access barrier 12 depending upon the position of the mobile transmitter 70 and whether the position of the door 12 is determined to be open or closed. Furthermore, the process 600 enables the access barrier 12 to be manually closed by use of the remote transmitters 40,44, as well as the wall station 42.

It will also be appreciated that the remote mobile transmitter 70 may be activated or manually turned on when one arrives closer to the destination so as to begin sending identification signals. Such a feature would also allow for further power savings on the mobile transmitter 70.

Figure 10:
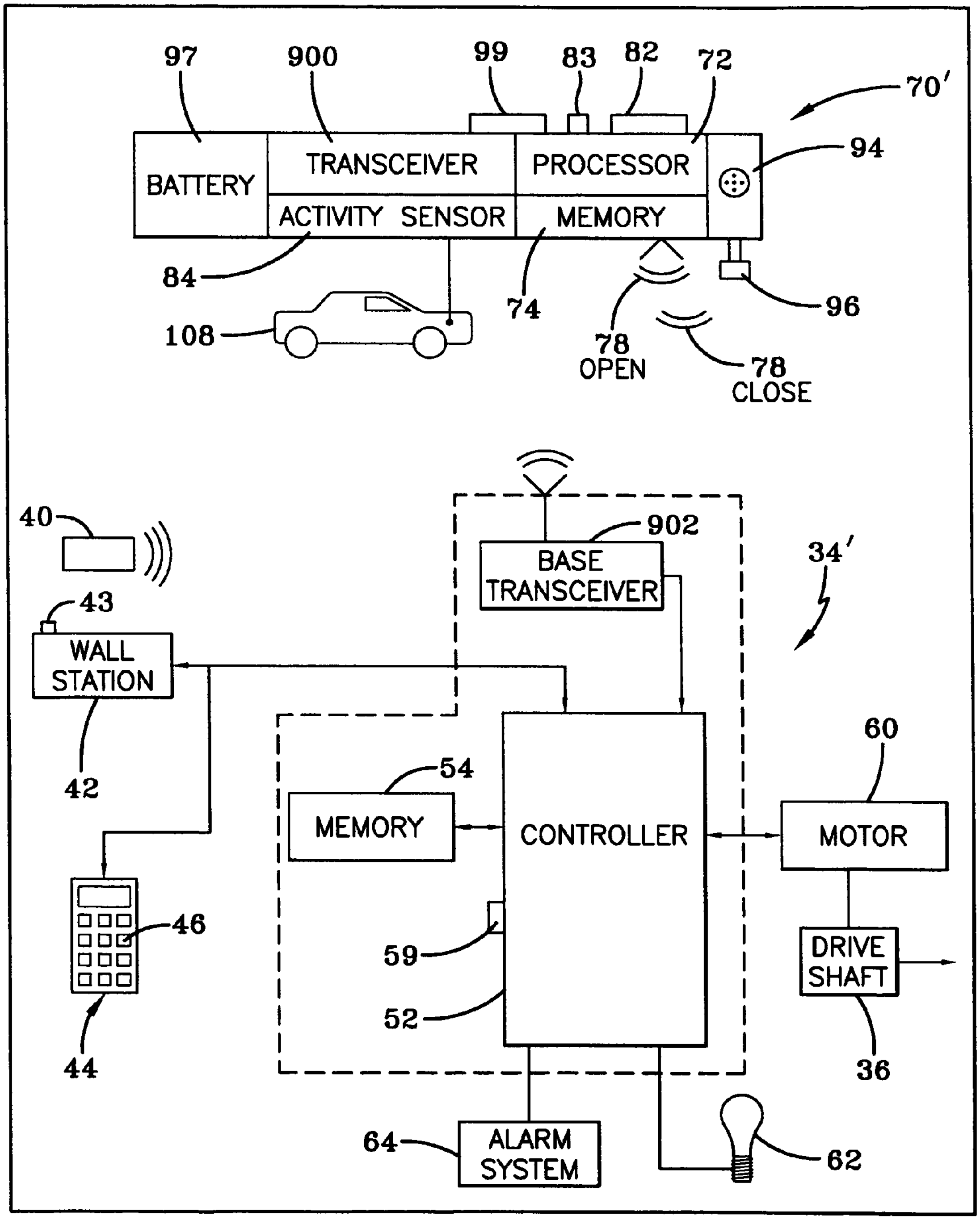
FIG. 10 is a block diagram of another embodiment of an operator system with a hands-free mobile remote transmitter and a base operator which includes a receiver to facilitate learning of the transmitter to the base operator according to the present invention.

FIG. 10 shows an alternative embodiment of the mobile transmitter and the base operator, designated generally by the numerals 70' and 34' respectively. The mobile transmitter 70' and base operator 34' are functionally and operationally equivalent to that discussed with respect to FIG. 2 of the present system 10, except that the mobile transmitter 70' includes a transceiver 900 in lieu of the emitter 76, and that the base operator 34' includes a base transceiver 902 in lieu of the base receiver 56. The present embodiment is configured to operate, and carry out the same functions and operational steps that were discussed above with respect to FIGS. 1-9 and provide additional functionality.

Specifically, the transceiver 900 allows the mobile transmitter 70' and the base operator 34' to have two-way communications between each other only for the purpose of learning the mobile transmitter 70' to the base operator 34'. The two-way communication allows both the base operator 34' and the mobile transmitter 70' to communicate in order to select a clear communication frequency to be used by the mobile transmitter 70' to send commands, such as the mobile open and close signals 78, to the base operator 34'. Exemplary commands may comprise a barrier open/close command to actuate the barrier 12 between open and closed positions. Additionally, the two-way communication between the base operator 34' and the mobile transmitter 70' during the learning process may allow a suitable security code, or other data to be selected and stored. The security code ensures that only mobile transmitters 70' that have been properly learned with the base operator 34' are permitted to execute commands at the base operator 34'. For example, the security code used by the base operator 34' to identify a learned mobile transmitter 70' may be used to authenticate command signals sent therefrom. It should be appreciated that the security code may comprise a rolling code that may employ any suitable encryption algorithm.

Figure 11:
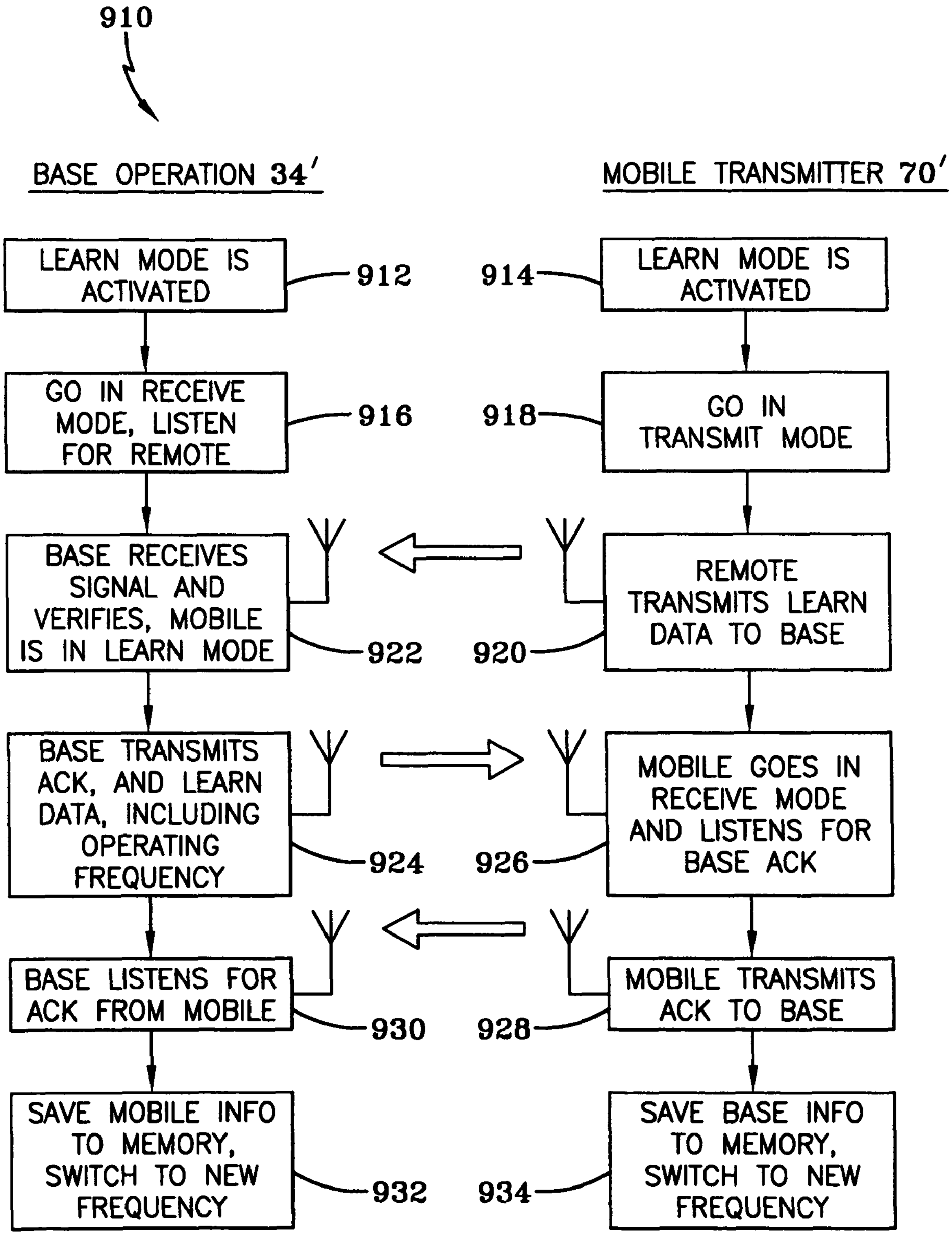
FIG. 11 is an operational flowchart showing the operational steps of the embodiment shown in FIG. 10 that are taken to learn the mobile transmitter to the base operator according to the present invention.

Turning to FIG. 11, the operational steps taken by the mobile transmitter 70' and the base operator 34' during the learning process, or learn mode, are generally referred to by the numeral 910. It should be appreciated, however, that the steps discussed below may be performed in a somewhat different order, while still achieving the result of learning the mobile transmitter 70' to the base operator 34'. Initially, at steps 912 and 914 of the process 910, the learn mode of the remote transmitter 70' and the base operator 34' are respectively activated. The base operator 34' may be placed into the learn mode by depressing the learn button 59 on the base controller 52. Likewise, the mobile transmitter 70' may be placed in the learn mode by depressing the learn/door move button 82 on the mobile transmitter 70'. Other suitable ways of enabling learning of the remote transmitter 70' to the base operator 34' may be implemented. Once the learn mode is invoked at the base operator 34', the base operator 34' enters a receive mode at step 916, and listens via the base transceiver 902 for a learning signal/learning data that is sent by the mobile transmitter 70'. It should be appreciated that the learning data may be embodied in a wireless signal communicated between the mobile transmitter 70' and the base operator 34', and thus the use of the terms learning signal or learning data as used herein is meant to have substantially the same meaning.

Somewhat simultaneously with step 916, the mobile transmitter 70' enters a transmit mode, as indicated at step 918. During the transmit mode, the transceiver 900 of the mobile transmitter 70' initiates the transmission of the learning signal to the transceiver 902 of the base operator 34', as indicated at step 920. Upon the receipt of the learning signal/learning data by the base transceiver 902, the base operator 34' analyzes the signal to verify that the mobile transmitter 70' is in the learn mode, as indicated at step 922 of the process 910. At step 924, if the base operator 34' determines that the mobile transmitter 70' is in the learn mode, the base operator 34' proceeds to transmit a first acknowledge (ACK) signal, along with the learning data that includes the desired operating frequency that the base operator 34' has selected for communications with the mobile transmitter 70'. Next, at step 926, the mobile transmitter 70' enters a receive mode and listens for the first acknowledge (ACK) signal, and the learning data sent by the base operator 34'. If the mobile transmitter 70' receives the first acknowledge (ACK) signal and the learn data transmitted by the base operator 34', the mobile transmitter 70' transmits a second acknowledge (ACK) signal back to the base operator 34', as indicated at step 928. At step 930, the base operator 34' listens for the second acknowledge signal sent by the mobile transmitter 70'. If at step 932, the base operator 34' receives the second acknowledge (ACK) signal from the mobile transmitter 70', the base operator 34' stores the learn data to the memory 74. In addition, the base operator 34' switches to the quiet communication frequency that is to be also utilized by the transmitting portion of the transceiver 900 of the mobile transmitter 70'. Correspondingly, the mobile transmitter 70' stores the learn data received from the base operator 34' in its memory 54, and switches to the same quiet communication frequency that was selected by the base operator 34'. Thus, once the communication frequency has been established, the base operator 34' is prohibited from sending communication signals or data to the mobile transmitter 70'. In other words, all other communications, except for the learning process, are one-way from the mobile transmitter 70' to the receiving portion of the base transceiver 902 during an operate mode. Thus, the mobile transmitter 70' can continue to transmit various signals needed, such as mobile open and close signals 78, and to transmit any associated data to the base operator 34' in order to effect the functions of any of the embodiments disclosed herein.

As indicated in the preceding discussion, by replacing the emitter 76 as shown in FIG. 2 with the transceiver 900, the selection of a clear communication frequency is improved. Thus, the end user simply initiates the learn mode on both the mobile transmitter 70' and the base operator 34' and the system automatically identifies and selects the clearest communication frequency or channel to use for subsequent one-way communications from the transmitter to the base. As such, the user is spared the time and aggravation of manually selecting a quiet communication frequency for the base operator 34 and the mobile transmitter 70 to share.

Based upon the foregoing, one advantage of the present invention is to provide a mobile transmitter, which periodically generates a mobile open signal receivable by the base operator to initiate the automatic opening of an access barrier as the carrying device moves toward the base operator. Another advantage of the present invention is that it provides a mobile transmitter that maintains an angle position detector that is capable of determining when the angular position of a carrying device exceeds a predetermined value, so as to automatically close an access barrier. Another advantage of the operator system is that the mobile transmitter provides an activity sensor that is capable of determining when the linear movement of a carrying device exceeds a predetermined value, so as to automatically close the access barrier. The proposed system is also advantageous in that manual user input is not required and the user has the ability to set sensitivity for when a mobile open signal is generated based upon the position of the carrying device with respect to the access barrier. Another advantage of the present system is that two-way communications takes place only during the learn mode between the base operator and the mobile transmitter. Still another advantage is that after the learning process is complete, only one-way communications take place between the base operator and the mobile transmitter during the operate mode.

Thus, it can be seen that the objects of the invention have been satisfied by the structure and its method for use presented above. While in accordance with Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. An operator system for automatically controlling access barriers used to enclose a carrying device, comprising:

a base controller associated with at least one access barrier;

a memory device associated with said base controller, said base controller storing said open and close signals in said device for later generating barrier movement commands, wherein said base controller monitors the conditions of the access barrier;

at least one base receiver associated with said base controller;

at least one mobile transmitter transmitting an open signal and a close signal, wherein said mobile transmitter monitors a change in position of the carrying device and transmits said close signal when said mobile transmitter detects that the position of the carrying device has changed a predetermined amount, and wherein said mobile transmitter transmits said open signal automatically, said base controller selectively generating barrier movement commands depending upon when said open and close signals are received by said at least one base receiver; and a counter which is incremented when said open signal is not received, and wherein the status of the access barrier is checked by said base controller after said counter reaches a predetermined value.

2. An operator system for automatically controlling access barriers used to enclose a carrying device, comprising:

a base controller associated with at least one access barrier;

at least one base receiver associated with said base controller;

at least one mobile transmitter transmitting an open signal and a close signal, wherein said transmitter monitors a change in position of the carrying device and transmits said close signal when said mobile transmitter detects that the position of the carrying device has changed a predetermined amount, and wherein said mobile transmitter transmits said open signal automatically, said base controller selectively generating barrier movement commands depending upon when said open and close signals are received by said at least one base receiver;

a position detector coupled to said mobile transmitter to monitor a change in the position of the carrying device, wherein said mobile transmitter transmits said close signal to said barrier operator so as to close the access barrier when said position detector detects that the position of the carrying device has changed a predetermined amount;

an emitter configured to transmit said close signal, wherein said emitter transmits said close signal to said barrier operator to automatically close the access barrier;

an activity sensor coupled to the carrying device to detect when the carrying device is active; and a mobile controller coupled to each of said position detector, said activity sensor, and said emitter, wherein said mobile transmitter is activated when said activity sensor detects that the carrying device is active; and wherein when said mobile transmitter is active, said emitter transmits a close signal to the barrier operator to close the access barrier when said position detector detects that the angular position of the carrying device has changed by a predetermined amount.

3. The operator system of claim 2, wherein said position detector, comprises a two-axis compass.

4. The operator of claim 2, wherein after the transmission of said close signal said mobile transmitter is prevented from transmitting subsequent close command signals until after said activity sensor detects that the carrying device is inactive.

5. The operator system of claim 2, wherein said emitter transmits a close signal to the barrier operator to close the access barrier when said position detector detects that the carrying device has traveled a predetermined distance and the angular position of the carrying device has not changed by said predetermined amount.

6. A method of automatically closing and opening an access barrier based on a change in position of a carrying device comprising:

automatically and periodically transmitting from a mobile transmitter maintained in the carrying device an open signal;

determining whether a positional change of the carrying device exceeds a predetermined threshold value;

transmitting from said mobile transmitter a close signal if a change in a position of the carrying device exceeds said predetermined threshold value;

receiving in a barrier operator that controls movement of the access barrier said open signal and said close signal;

closing the barrier when said close signal is received and the access barrier is open; and opening said access barrier after receiving said open signal and the access barrier is closed, but only after not receiving said open signal for a predetermined period of time.

7. The method of claim 6, further comprising:

determining whether angular movement of said carrying device exceeds a predetermined angular value; and transmitting said close signal to said barrier operator to automatically close said access barrier if the angular change in position of the carrying device exceeds said predetermined threshold value.

8. The method of claim 7 further comprising:

determining whether a linear movement of said carrying device exceeds a predetermined threshold distance value in the event the angular change has not been exceeded; and transmitting said close signal to said barrier operator to automatically close said access barrier if a predetermined threshold distance value is exceeded.

9. The method of claim 6 further comprising:

determining whether a linear movement of said carrying device exceeds a predetermined threshold distance value; and transmitting said close signal to said barrier operator to automatically close said access barrier if a predetermined threshold distance value is exceeded.

10. The method of claim 6, further comprising;

continuously cycling between a sleep state and an awake state, such that if said mobile transmitter detects that the carrying device is active during said awake state, said mobile transmitter is fully turned on.

11. The method of claim 6, further comprising:

detecting whether the carrying device is on and awaiting said mobile transmitter to perform the determining and transmitting functions.

12. The method of claim 6, further comprising:

setting said predetermined threshold distance value of at least 15 to 500 feet.

13. The method of claim 6, further comprising:

setting said predetermined threshold angle value of at least 35 to 45 degrees.

* * * * *